(12) United States Patent
Kasamatsu

(10) Patent No.: US 7,311,314 B2
(45) Date of Patent: Dec. 25, 2007

(54) VEHICULAR SUSPENSION SYSTEM

(75) Inventor: Akira Kasamatsu, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 422 days.

(21) Appl. No.: 10/512,771

(22) PCT Filed: Mar. 12, 2003

(86) PCT No.: PCT/JP03/02912

§ 371 (c)(1),
(2), (4) Date: Oct. 28, 2004

(87) PCT Pub. No.: WO2004/080735

PCT Pub. Date: Sep. 23, 2004

(65) Prior Publication Data

US 2005/0225048 A1 Oct. 13, 2005

(51) Int. Cl.
*B60G 17/005* (2006.01)

(52) U.S. Cl. .................. 280/5.501; 280/124.157; 280/124.16

(58) Field of Classification Search ......... 280/124.157, 280/124.158, 124.159, 124.16, 124.161, 280/5.501, 5.502, 5.504, 5.507, 5.508, 124.106, 280/124.107; 701/37, 38, 39

See application file for complete search history.

(56) References Cited

U.S. PATENT DOCUMENTS

| | | | | |
|---|---|---|---|---|
| 4,598,929 A | * | 7/1986 | Kumagai et al. | 280/5.513 |
| 5,078,421 A | * | 1/1992 | Kokubo et al. | 280/5.5 |
| 5,090,727 A | * | 2/1992 | Kii et al. | 280/5.508 |
| 5,160,161 A | * | 11/1992 | Tsukamoto et al. | 280/5.501 |
| 5,296,785 A | * | 3/1994 | Miller | 318/254 |
| 5,480,188 A | | 1/1996 | Heyring | |
| 5,735,540 A | * | 4/1998 | Schiffler | 280/5.501 |
| 5,936,519 A | * | 8/1999 | Nakajima et al. | 340/444 |
| 6,015,155 A | * | 1/2000 | Brookes et al. | 280/5.505 |

(Continued)

FOREIGN PATENT DOCUMENTS

GB 2 338 460 A 12/1999

(Continued)

OTHER PUBLICATIONS

Lateral Acceleration and Weight Transfer, available at http://web.archive.org/web/20010822125008/http://members.aol.com/sc-cacuda/cars/3SmithTa.html (as published Aug. 22, 2001).*

(Continued)

Primary Examiner—Paul N. Dickson
Assistant Examiner—Joseph Rocca
(74) Attorney, Agent, or Firm—Oliff & Berridge, PLC

(57) ABSTRACT

A vehicular suspension system having a fluid circuit including two fluid cylinders provided on respective front-wheel and rear-wheel sides, and two fluid passage systems one of which connects one of two fluid chambers of the fluid cylinder on the front-wheel side to the corresponding one of the two fluid chambers of the fluid cylinder on the rear-wheel side, and the other of which connects the other fluid chamber of the front-wheel side fluid cylinder to the other fluid chamber of the rear-wheel side fluid cylinder, the suspension system including a diagnosing device operable to diagnose the fluid circuit for any abnormality, on the basis of at least one of fluid pressures in the two fluid passage systems.

18 Claims, 12 Drawing Sheets

U.S. PATENT DOCUMENTS

| | | | |
|---|---|---|---|
| 6,092,014 A * | 7/2000 | Okada | 701/70 |
| 6,206,383 B1 * | 3/2001 | Burdock | 280/5.508 |
| 6,302,417 B1 | 10/2001 | Heyring | |
| 6,428,024 B1 * | 8/2002 | Heyring et al. | 280/124.106 |
| 6,669,208 B1 | 12/2003 | Monk et al. | |
| 2004/0245732 A1 * | 12/2004 | Kotulla et al. | 280/5.502 |

FOREIGN PATENT DOCUMENTS

| | | |
|---|---|---|
| JP | B2-05-21768 | 3/1993 |
| JP | Y2 7-51923 | 11/1995 |
| JP | A 9-123730 | 5/1997 |
| JP | A 11-510761 | 9/1999 |
| JP | A-2001-511735 | 8/2001 |
| JP | A 2002-541015 | 12/2002 |
| JP | A 2003-80917 | 3/2003 |
| JP | A-2003-509281 | 3/2003 |
| WO | WO 95/23076 | 8/1995 |
| WO | WO 97/06971 | 2/1997 |
| WO | WO 98/18641 | 5/1998 |
| WO | WO 98/28160 | 7/1998 |
| WO | WO 98/36923 | 8/1998 |
| WO | WO 98/47730 | 10/1998 |
| WO | WO 00/61393 | 10/2000 |
| WO | WO 00/61394 | 10/2000 |
| WO | WO 01/21423 A1 | 3/2001 |

OTHER PUBLICATIONS

USPTO Science & Technology Information Search Report (STIC) EIC 3600, search report.*

* cited by examiner

VEHICULAR SUSPENSION SYSTEM

TECHNICAL FIELD

The present invention relates to a vehicular suspension system capable of restricting roll motions of a vehicle.

BACKGROUND ART

JP-11-510761A discloses a vehicular suspension system including a hydraulic cylinder provided to control a resilient force of a stabilizer bar for front wheels of a vehicle, a hydraulic cylinder provided to control a resilient force of a stabilizer bar for rear wheels of the vehicle, two fluid passages one of which connects one of two fluid chambers separated from each other by a piston of one of the two hydraulic cylinders to a corresponding one of two fluid chambers separated from each other by a piston of the other hydraulic cylinder, and the other of which connects the other two corresponding fluid chambers of the two hydraulic cylinders, and a communication control valve operable between an open state and a closed state for respectively permitting and inhibiting fluid communication between the two fluid passages.

JP-2002-541015A discloses a vehicular suspension system including four hydraulic cylinders each disposed between a wheel-side member and a vehicular-body-side member, for respective front right and left and rear right and left wheels, and two fluid passage systems one of which connects one of two fluid chambers separated by a piston of each hydraulic cylinder to a corresponding one of the two fluid chambers of each of the other hydraulic cylinders, and the other of which connects the other of the two fluid chambers of above-indicated each hydraulic cylinder and the other of the two fluid chambers of each of above-indicated other hydraulic cylinders, and a communication control valve operable between an open state and a closed state for respectively permitting and inhibiting fluid communication between the two sets of fluid passages.

DISCLOSURE OF INVENTION

It is an object of the present invention to make it possible to detect an abnormality of a vehicular suspension system constructed as disclosed in the above-identified publications. This object may be achieved according to any one of the following modes of the present invention in the form of a vehicular suspension system, each of which is numbered like the appended claims and depends from the other mode or modes, where appropriate, for easier understanding of technical features described in this specification. It is to be understood that the present invention is not limited to the technical features or any combinations thereof in the following modes. It is to be further understood that a plurality of elements or features included in any one of the following modes of the invention are not necessarily provided all together, and that the invention may be embodied with selected one or ones of the elements or features described with respect to any one mode.

(1) A suspension system for a vehicle, characterized by comprising:
  a fluid circuit including at least one fluid cylinder provided on each of a front-wheel side and a rear-wheel side of the vehicle, each of the at least one fluid cylinder including a housing, and a piston which separates an interior space of the housing into two fluid chambers, each fluid cylinder being disposed between a wheel-side member of the vehicle and a body-side member of the vehicle, such that there arises a difference between fluid pressures in the two fluid chambers when at least one of a left wheel and a right wheel is displaced in a vertical direction relative to a body of the vehicle, and (b) two fluid passage systems one of which connects one of the two fluid chambers of the at least one fluid cylinder on the front-wheel side to a corresponding one of the two fluid chambers of the at least one fluid cylinder on the rear-wheel side, and the other of which connects the other of the two fluid chambers of the at least one fluid cylinder on the front-wheel side to the other of the two fluid chambers of the at last one fluid cylinder on the rear-wheel side; and
  a diagnosing device operable to diagnose the fluid circuit on the basis of at least one of fluid pressures in the two fluid passage systems.

In the vehicular suspension system according to the present mode of the invention, at least one fluid cylinder is provided on each of the front-wheel and rear-wheel sides of the vehicle. Accordingly, the present vehicular suspension system includes at least two fluid cylinders, and the corresponding ones of the two fluid chambers of the at least two fluid cylinders are connected to each other through the fluid passages. The corresponding fluid chambers may be connected to each other through a single fluid passage, or a plurality of fluid passages. In either of these cases, at least one fluid passage connecting the corresponding fluid chambers to each other is referred to as one fluid passage system.

The corresponding fluid chambers indicated above have the same function. For instance, the corresponding fluid chambers are fluid chambers the fluid pressures of which are all raised or lowered when the vehicle body has a roll motion. Each hydraulic piston may be installed such that its piston rod is attached to a body-side member of the vehicle, or alternatively to a wheel-side member. The manners of installation of the fluid cylinders on the front-wheel and rear-wheel sides may be reversed with respect to each other. Accordingly, all of the corresponding fluid chambers are not necessarily located on the same rod side, or on the same head side.

The fluid circuit is arranged to permit the fluid flows between the corresponding fluid chambers through the fluid passages, where one pair of two wheels selected from the front right and left wheels and rear right and left wheels, which are located at respective diagonally opposite positions of the vehicle, and another pair of two wheels which are located at the other respective diagonally opposite positions, are moved vertically moved relative to the vehicle body, in opposite directions. The fluid flows between the corresponding fluid chambers through the fluid passages permit the relative movements of the wheels. In this case, the fluid flows through the fluid passages do not cause a substantial fluid pressure difference between the two fluid chambers of each fluid cylinder. Where the vehicle body is subjected to a rolling force, on the other hand, no fluid flows take place between the corresponding fluid chambers through the fluid passages, so that a difference between the amounts of vertical movement of the right and left wheels on each of the front and rear sides of the vehicle is restricted, so as to restrict the roll motion of the vehicle. In the absence of the fluid flows through the fluid passages, there arises a fluid pressure difference between the two fluid chambers of each fluid cylinder, so that forces corresponding to the fluid pressure difference act on the right and left wheels, so as to restrict a difference between the amounts of vertical movements of the right and left wheels relative to the vehicle body. In other words, the right and left wheels receive forces that tend to reduce the difference of the vertical movement amounts of these wheels.

The fluid flows between the corresponding fluid chambers are caused by a difference in the fluid pressures in the plurality of fluid chambers connected to each other through the fluid passages. When the fluid pressure in one of the two fluid chambers (of the plurality of fluid chambers) is raised while the fluid pressure in the other fluid chamber is lowered, the fluid flows between these two fluid chambers. The fluid flows in question do not include fluid flows between the fluid passages and accumulators which may be provided to prevent an excessive rise of the fluid pressure in the fluid passages or a drop of the fluid pressure to a negative level.

A difference between the fluid pressures in the two fluid chambers of each fluid cylinder is generated, for example, when the fluid flow through the fluid passage does not take place, or where the opposite surfaces of the piston which partially define the respective two fluid chambers have different pressure-receiving areas. The forces that restrict a difference between the amounts of vertical movement of the right and left wheels relative to the vehicle body are generated because the fluid flow through the fluid passage does not take place, that is, in the former case. Where the fluid cylinder is arranged to cause a fluid pressure difference between its two fluid chambers, as in the latter case, this fluid pressure difference is larger than the fluid pressure difference in the former case.

The diagnosing device diagnoses the fluid circuit on the basis of at least one of the fluid pressures in the two fluid passage systems. The diagnosis may be based on both of the fluid pressures in the two fluid passage systems, or on only the fluid pressure in one of the two fluid passage systems. For instance, the diagnosis is based on a difference between the fluid pressures in the two fluid passage systems, or on a higher one of these two fluid pressures.

The fluid used by the vehicular suspension system according to the present mode of the invention may a liquid or a gas. Where the gas is used, it is desirable to use a highly compressible gas.

(2) The suspension system according to the mode (1) of the invention, wherein the diagnosing device comprises (a) a roll-motion-related-quantity detecting device operable to detect a roll-motion-related quantity relating to a roll motion of the vehicle, (b) a fluid-pressure detecting device operable to detect at least one of the fluid pressures in the two fluid passage systems, and (c) an abnormality determining portion operable to determine whether the fluid circuit is abnormal, on the basis of a relationship between the fluid pressure detected by the fluid-pressure detecting device and the roll-motion-related quantity detected by the roll-motion-related-quantity detecting device.

In the absence of an abnormality of the fluid circuit such as a fluid leakage, there exists a predetermined relationship between a force acting on the piston of each cylinder and the fluid pressure in at least one of the two fluid passage systems. Therefore, it is possible to estimate the fluid pressure in at least one of the fluid passage systems, in the absence of an abnormality of the fluid circuit, on the basis of the force actually acting on the piston and according to the predetermined relationship. When the actual fluid pressure is lower than the estimated fluid pressure, for example, it is possible to assume that there is a possibility of a fluid leakage from the fluid circuit.

Although it is not easy to detect the force actually acting on the piston, it is possible to obtain (calculate or estimate) the force on the basis of the roll-motion-related quantity relating to the roll motion of the vehicle, for example. The roll-motion-related quantity includes a roll angle, a roll speed (roll rate), and an acceleration of a roll motion. The roll-motion-related quantity may be obtained while the vehicle is running or stationary. In other words, the roll-motion-related quantity includes not only a quantity relating to a dynamic roll of the vehicle, but also a quantity relating to a static roll of the vehicle.

The roll-motion-related quantity may be obtained on the basis of an output of a vehicle height sensor provided for each wheel of the vehicle, an output of a roll rate sensor, or an output of a roll angle sensor. During running of the vehicle, the vehicle has a roll motion due to turning or cornering of the vehicle.

The roll-motion-related-quantity detecting device may be considered to be a device for detecting an attitude of the vehicle, more precisely, a rotary movement of the vehicle body about an axis extending in the longitudinal direction of the vehicle.

(3) The suspension system according to the mode (2) of the invention, wherein the roll-motion-related-quantity detecting device includes a centrifugal-force-related-quantity detecting device operable to detect a centrifugal-force-related quantity relating to a centrifugal force acting on the vehicle.

The force acting on the piston can be easily estimated on the basis of the centrifugal-force-related quantity. The centrifugal-force-related quantity includes a centrifugal force per se acting on the vehicle, a physical quantity equivalent to the centrifugal force, and a physical quantity which can be used to obtain the centrifugal force. For instance, the centrifugal-force-related quantity is a lateral acceleration value of the vehicle, or a combination of a radius of turning (steering angle) and a running speed of the vehicle.

(4) The suspension system according to the mode (2) or (3) of the invention, wherein the roll-motion-related-quantity detecting device includes a lateral-acceleration detecting device operable to detect a lateral acceleration value of the vehicle.

(5) The suspension system according to any one of the modes (1)-(4), wherein the diagnosing device includes (a) a running-condition detecting device operable to detect a running condition of the vehicle, (b) a fluid-pressure detecting device operable to detect at least one of the fluid pressures in the two fluid passage systems, and (c) an abnormality determining portion operable to determine whether the fluid circuit is abnormal, on the basis of a relationship between the fluid pressure detected by the fluid-pressure detecting device and the running condition detected by the running-condition detecting device.

The running-condition detecting device is preferably arranged to detect a turning or cornering state of the vehicle. For example, the running-condition detecting device is arranged to detect a lateral acceleration value of the vehicle, a combination of a radius of turning (or a steering angle) and a running speed of the vehicle, or a yaw rate of the vehicle. The running-condition detecting device may include a lateral-acceleration detecting sensor, a combination of a steering-angle sensor and a vehicle speed sensor, or a yaw rate sensor. The radius of turning of the vehicle may be obtained on the basis of a steering angle of a steering wheel of the vehicle, or a steering angle of the front or rear wheels of the vehicle. The running condition may be represented by two or more physical quantities indicated above.

(6) The suspension system according to any one of the modes (1)-(5), wherein the diagnosing device includes (a)

a fluid-pressure detecting device operable to detect at least one of the fluid pressures in the two fluid passage systems, and (b) an abnormality determining portion operable to determine whether the fluid circuit is abnormal, on the basis of the fluid pressure detected by the fluid-pressure detecting device.

On the basis of the fluid pressure in at least one of the two fluid passage systems, it is possible to detect a fluid leakage of the fluid circuit. When the detected fluid pressure is abnormally low, for example, it is determined that a fluid leakage is present.

(7) The suspension system according to any one of the modes (1)-6), further comprising a fluid-circuit separating device operable to separate the fluid circuit into two parts, when the diagnosing device determines that the fluid circuit is abnormal.

In the vehicular suspension system according to the present mode of the invention, the fluid circuit is separated into two parts such that the two parts are isolated from each other, when the fluid circuit is found abnormal. This arrangement enables one of the two parts of the fluid circuit to restrict a roll motion of the vehicle, even in the event of occurrence of an abnormality in the other part of the fluid circuit. The fluid circuit is separated into the two parts, such that either one of these two parts which is normal is enabled to restrict the roll motion of the vehicle. According to this arrangement, the roll motion of the vehicle can he restricted by one of those two parts, even in the presence of an abnormality in the other part.

Where the fluid circuit includes a fluid cylinder on the front-wheel side and a fluid cylinder on the rear-wheel side, as described below, for example, the fluid circuit is separated into a part including the front-wheel-side fluid cylinder and a part including the rear-wheel-side fluid cylinder. Where the fluid cylinders are provided for the respective four wheels, the fluid circuit may be separated into a part including the fluid cylinder provided for one of the front and rear right wheels and the fluid cylinder provided for one of the front and rear left wheels, and a part including the other two fluid cylinders.

(8) The suspension system according to any one of the modes (1)-(7), 8, wherein the wheel-side member is a stabilizer bar provided on each of the front-wheel and rear-wheel sides of the vehicle, and the at least one fluid cylinder on each of the front-wheel and rear-wheel sides is disposed between the stabilizer bar and the body-side member, the two fluid passage systems consisting of two fluid passages one of which connects one of the two fluid chambers of the at least one fluid cylinder on the front-wheel side to a corresponding one of the two fluid chambers of the at least one fluid cylinder on the rear-wheel side, and the other of which connects the other of the two fluid chambers of the at least one fluid cylinder on the front-wheel side to the other of the two fluid chambers of the at least one fluid cylinder on the rear-wheel side.

For example, one of a piston rod extending from a piston of each fluid cylinder and a housing body of the fluid cylinder is fixed to the stabilizer bar, and the other of the piston rod and housing body is fixed to the body-side member.

The fluid cylinder is disposed so as to permit controlling of a resilient force generated by the stabilizer bar, and is fixed to a portion of the stabilizer bar which is offset from a longitudinally middle part of the stabilizer bar toward one longitudinal end of the stabilizer bar.

(9) The suspension system according to the mode (8), further comprising a cut-off device operable between a state for permitting fluid flows through the two fluid passages, and a state for inhibiting the fluid flows through the two fluid passages.

The cut-off device is operable to permit or inhibit the fluid flows through both of the two fluid passages. The cut-off device may include two cut-off valves provided for the respective two fluid passages. These two cut-off valves may be controllable independently of each other, or commonly. When the fluid flows through the two fluid passages are inhibited by the cut-off device, a part of the fluid circuit which includes the at least one fluid cylinder on the front-wheel side is isolated from a part of the fluid circuit including the at least one fluid cylinder on the rear-wheel side.

(10) The suspension system according to the mode (9), further comprising a cut-off-device control device operable to place the cut-off device in the state for inhibiting the fluid flows through the two passages, when said diagnosing device has detected an abnormality of the fluid circuit.

When the fluid flows through both of the two fluid passages are inhibited, the two fluid cylinders are isolated from each other. Accordingly, in the event of a fluid leakage from one of the two fluid cylinder or a portion of the fluid passages, for example, it is possible to prevent an influence of this fluid leakage on the other fluid cylinder. Since one of the two fluid cylinders on the front-wheel and rear-wheel sides of the vehicle is normally operable, it is possible to reduce the degree of deterioration of the roll-motion restricting effect.

(11) The suspension system according to any one of the modes (8)-(10), the two fluid passages are provided with respective accumulators, and control valves are disposed between the respective two fluid passages and the respective accumulators.

The fluid passages provided with the accumulators are protected from an excessive rise of their fluid pressures or a drop of the fluid pressures to a negative level. On the other hand, the provision of the accumulators may cause fluid flows from the fluid passages into the accumulators, giving rise to a possibility of an insufficient roll-motion restricting effect. In this event, the fluid flows from the fluid passages into the accumulators are preferably inhibited by the control valves. The control valves are desirably placed in the closed state when a fluid pressure difference between the two fluid passages is relatively large, and in the open state when the fluid pressure difference is relatively small. For instance, the control valves are pilot-operated valves, or solenoid-operated valves.

(12) The suspension system according to any one of the modes (1)-(7), wherein the at least one fluid cylinder provided on each of the front-wheel and rear-wheel sides of the vehicle consists of fluid cylinders disposed for the left and right wheels, respectively, between the wheel-side member and the body-side member, and the above-indicated one of the two fluid passage systems connects one of the two fluid chambers of each of the four fluid cylinders to a corresponding one of the two fluid chambers of the other of the four fluid cylinders, while the above-indicated other of the two fluid passage systems connects the other of the two fluid chambers of each of the four fluid cylinders to the other of the above-indicated other of the four fluid cylinders.

In the vehicular suspension system according to the above-described mode of the invention, the fluid cylinder is disposed between the wheel-side member and the body-side member, for each of the plurality of wheels provided on the vehicle. The wheel-side member may be a suspension arm for flexibly supporting the corresponding wheel, or an axle housing. Where the fluid cylinder is disposed between the axle housing and the body-side member, the fluid cylinder is preferably attached to a portion of the axle housing which is located one side of an intermediate portion which is nearer to the corresponding wheel. In either of these cases, the suspension device of the present vehicular suspension system may be of an independent suspension type or an axle suspension type.

Where the vehicle has four wheels on the respective front left and right sides and rear left and right sides, and the four fluid cylinders are provided for these front and rear left and right wheels, respectively, such that the fluid cylinders are oriented so as to extend in the vertical direction of the vehicle, for example, the fluid chambers formed on the upper side of the piston of the fluid cylinders for the front and rear right wheels correspond to the fluid chambers formed on the lower side of the piston of the fluid chambers for the front and rear left wheels, while the fluid chambers formed on the lower side of the piston of the fluid chambers for the front and rear left wheels correspond to the fluid chambers formed on the upper side of the piston of the fluid chambers for the front and rear left wheels. The corresponding fluid chambers of each of those two groups is connected to each other by one fluid passage system which consists of at least one fluid passage.

The above description applies to a vehicle having six or more wheels.

(13) The suspension system according to the mode (12), further comprising an emergency cut-off device operable to isolate a first fluid circuit and a second fluid circuit from each other, when an abnormality of the fluid circuit is detected by the diagnosing device, the first fluid circuit including the two fluid cylinders respectively provided for one of front and rear wheels located on a right side of the vehicle and one of front and rear wheels located on a left side of the vehicle, while the second fluid circuit including the other two fluid cylinders.

When an abnormality of the fluid circuit is detected, the fluid circuit is isolated from each other into two fluid circuits. Since one of the two fluid circuits is isolated from the other fluid circuit, this other fluid circuit is normally operable even in the presence of an abnormality such as a fluid leakage of the above-indicated one fluid circuit, so that the roll motion of the vehicle can be restricted by the operation of the above-indicated other fluid circuit.

For example, one of the fluid circuits includes the fluid cylinder for the front right wheel and the fluid cylinder for the front left wheel, while the other fluid circuit includes the fluid cylinder for the rear right wheel and the fluid cylinder for the rear left wheel. Alternatively, one of the fluid circuits includes the fluid cylinder for the front right wheel and the fluid cylinder for the rear left wheel, while the other fluid circuit includes the fluid cylinder for the rear right wheel and the fluid cylinder for the front left wheel.

(14) The suspension system according to the mode (13), wherein each of the two fluid passage systems includes a first fluid passage connecting the corresponding fluid chambers of the two fluid cylinders respectively provided for one of the front and rear wheels located on the right side of the vehicle and one of the front and rear wheels located on the left side of the vehicle, a second fluid passage connecting the corresponding fluid chambers of the other two fluid cylinders, and a third fluid passage connecting these first and second fluid passages, and the emergency cut-off device includes a fluid-passage cut-off device operable to inhibit fluid flows through the third fluid passage, wherein each of the two fluid passage systems includes a first fluid passage connecting the corresponding fluid chambers of the two fluid cylinders respectively provided for one of the front and rear wheels located on the right side of the vehicle and one of the front and rear wheels located on the left side of the vehicle, a second fluid passage connecting the corresponding fluid chambers of the other two fluid cylinders, and a third fluid passage connecting these first and second fluid passages, and the emergency cut-off device includes a fluid-passage cut-off device operable to inhibit fluid flows through the third fluid passage.

In the vehicular suspension system according to the present mode of the invention, the first fluid passage and the second fluid passage are isolated from each other by inhibiting the fluid flows through the third fluid passage, so that the fluid circuit including the fluid cylinders having the fluid chambers connected to each other by the first fluid passage, and the fluid circuit including the fluid cylinders having the fluid chambers connected to each other by the second fluid passage are isolated from each other. In other words, the fluid circuit including the first fluid passage, and the fluid circuit including the second fluid passage are isolated from each other.

(15) The suspension system according to any one of the modes (1)-(14), wherein the fluid circuit includes (a) a connecting passage connecting the two fluid passage systems to each other, and (b) a communication control valve provided in the connecting passage, the suspension system further comprising a communication-control-valve control device operable to control the communication control valve on the basis of a running condition of the vehicle.

In the vehicular suspension system according to the present mode of the invention, the communication control valve is opened to permit fluid flows through the connecting passage, and closed to inhibit the fluid flows. In the open state of the communication control valve, the two fluid passage systems are communication with each other. In the closed state, the two fluid passage systems are isolated from each other, so that the two fluid chambers separated from each other by the piston of each fluid cylinder are isolated from each other.

Accordingly, the fluid pressure in each the fluid chamber can be controlled to a value depending upon the running condition of the vehicle, by opening and closing the communication control valve on the basis of the running condition. For example, it is possible to avoid a fluid pressure difference of the two fluid chambers of each fluid cylinder (e.g., a fluid pressure difference larger than a predetermined fluid pressure difference which is caused by a difference of pressure-receiving areas of the opposite surfaces of the piston partially defining the respective two fluid chambers, for instance), which would cause an inclination of the attitude of the vehicle, during a straight running of the vehicle, so that the communication control valve makes it possible to reduce a discomfort as felt by the vehicle operator when the vehicle running straight with its attitude being not substantially horizontal.

The running condition of the vehicle is detected by a running-condition detecting device. Preferably, the running-condition detecting device is arranged to detect a running condition of the vehicle, on which the attitude of the vehicle can be estimated. For instance, the running-condition detecting device is arranged to detect a straight running state or a turning or cornering state of the vehicle. The running-condition detecting device may be arranged to directly detect the straight or turning state of the vehicle, or estimate the same on the basis of an operating state of a vehicle control member manually operated by the vehicle operator. In the former case, the running-condition detecting device may include at least one of sensors such as a yaw rate sensor and a lateral acceleration sensor. In the latter case, the running-condition detecting device may include a steering angle sensor.

The communication control valve is arranged to be closed when the vehicle is in a turning state, in which there is a fluid pressure difference between the two fluid chambers of the fluid cylinder. When the vehicle has a roll motion, this arrangement is effective to reduce a difference between the distances of vertical movements of the right wheel and the left wheel relative to the vehicle body, which are caused by the fluid pressure difference. The diagnosing device is operated to diagnose the fluid circuit while the communication control valve is placed in its closes state.

(16) The suspension system according to the mode (15), wherein the communication-control-valve control device includes a fluid-pressure control portion operable to control the communication control valve for controlling a fluid pressure in each of the two fluid chambers of the above-indicated at least one fluid cylinder such that the two fluid chambers do not provide an effect of restricting a roll motion of the vehicle, while the vehicle is running straight.

During a straight running state of the vehicle, each fluid cylinder is generally controlled such that the piston is held in a state of equilibrium between two forces acting thereon in the opposite directions, so that the fluid cylinder does not provide the roll-motion restricting effect.

Where the surfaces of the piston partially defining the respective two fluid chambers have the same pressure-receiving areas, the piston is placed in its state of equilibrium of the two forces acting thereon in the opposite directions when the two fluid chambers have the same fluid pressure. Where the surfaces of the piston partially defining the respective two fluid chambers have different pressure-receiving areas, on the other hand, the piston is placed in its state of equilibrium of the two forces, when a product of the fluid pressure in one of the two fluid chambers and the pressure-receiving area of the corresponding surface of the piston is equal to a product of the fluid pressure in the other fluid chamber and the pressure-receiving area of the corresponding surface of the piston. In this case, the fluid pressure in the fluid chamber partially defined by the larger pressure-receiving surface area of the piston is lower than the fluid pressure in the fluid chamber partially defined by the smaller pressure-receiving surface area of the piston.

(17) A suspension system for a vehicle, characterized by comprising:
  a fluid circuit including (a) at least one fluid cylinder provided on each of a front-wheel side and a rear-wheel side of the vehicle, each of the at least one fluid cylinder including a housing, and a piston which separates an interior space of a housing into two fluid chambers, each fluid cylinder being disposed between the wheel-side member of the vehicle and a body-side member of the vehicle, such that there arises a difference between fluid pressures in the two fluid chambers when at least one of a left wheel and a right wheel is displaced in a vertical direction relative to a body of the vehicle, and (b) two fluid passage systems connecting corresponding ones of the two fluid chambers of each of the fluid cylinders;

systems one of which connects one of the two fluid chambers of the at least one fluid cylinder on the front-wheel side to a corresponding one of the two fluid chambers of the at least one fluid cylinder on the rear-wheel side, and the other of which connects the other of the two fluid chambers of the at least one fluid cylinder on the front-wheel side to the other of the two fluid chambers of the at least one fluid cylinder on the rear-wheel side;
  a separating-device control device operable to control said separating device on the basis of at least one of fluid pressures in said two fluid passage systems.

In the vehicular suspension system according to the present mode of the invention, the separating device is controlled on the basis of at least one of the fluid pressures in the two fluid passage systems.

The vehicular suspension system according to the present mode may adopt the technical feature according to any one of the above-described modes (1)-(16). For example, the separating device may be controlled to separate the fluid circuit into two parts, when an abnormality of the fluid circuit is detected.

(18) The suspension system according to the mode (17), wherein the separating-device control device includes (a) a fluid-pressure detecting device operable to detect at least one of the fluid passage systems in the two fluid passages, and (b) a separating-device control portion operable to control the separating device on the basis of the at least one of the fluid passage systems detected by the fluid-pressure detecting device.

The separating device may be arranged to control the separating device on the basis of a higher one of the fluid pressures in the respective two fluid passages, or a difference between these fluid pressures.

(19) The suspension system according to the mode (17) or (18), wherein the separating-device control device includes (c) a roll-motion-related-quantity detecting device operable to detect a roll-motion-related quantity relating to a roll motion of the vehicle, and (d) a roll-motion-dependent control portion operable to control the separating device on the basis of a relationship between the roll-motion-related quantity detected by the roll-motion-related-quantity detecting device and at least one of the fluid pressures in the two fluid passage systems.

(20) The suspension system according to any one of the modes (1)-(19), wherein each of the at least one fluid cylinder has two piston rods extending from the piston in respective opposite directions, and one of the two piston rods is held in engagement with the wheel-side member.

BEST MODE FOR CARRYING OUT THE INVENTION

Figure 1:
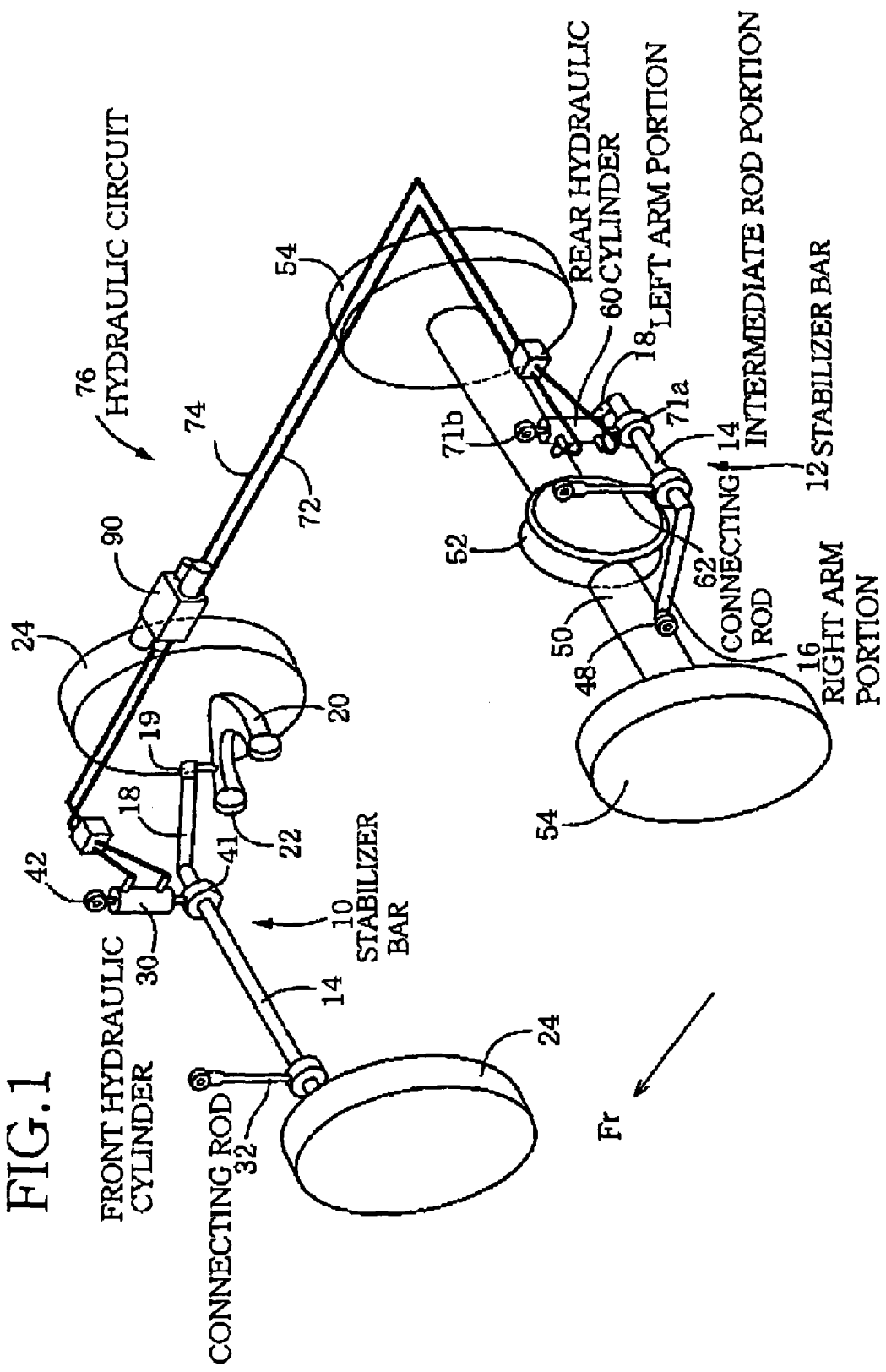
FIG. 1 is a view schematically showing a vehicular suspension system according to one embodiment of the present invention.

Referring to the drawings, there will be described in detail the vehicular suspension system according to one embodiment of the present invention. This vehicular suspension system is provided with stabilizer bars, and includes a roll-motion restricting device.

As shown in FIG. 1, there are shown a stabilizer bar 10 for front wheels, and a stabilizer bar 12 for rear wheels. Each of these stabilizer bars 10, 12 is a generally U-shaped member which has torsional resilience. Each stabilizer bar 10, 12 consists of an intermediate rod portion 14 extending in the width or lateral direction of a vehicle, and left and right arm portions 16 and 18 which are formed integrally with the intermediate rod portion 14, so as to extend from the respective opposite longitudinal ends of the intermediate rod portion 14 in a direction almost parallel to the longitudinal direction of the vehicle.

Lower arms 20 are provided adjacent to the respective front wheels, so as to flexibly support the front wheels, and are flexibly supported at their connecting portions 22 by respective members of the body of the vehicle. The stabilizer bar 10 is supported pivotably by an intermediate portion of each lower arm 20, at its connecting portions 19 which are provided at respective free ends of the left and right arm portions 16, 18 (left arm portion 16 not shown in FIG. 1) and which include respective rubber bushings or ball joints. The stabilizer bar 10 is also supported by suitable vehicle body members, through a hydraulic cylinder 30 at a right end section of its intermediate rod portion 14, and through a connecting rod 32 at a left end section of the intermediate rod portion 14.

Figure 2:
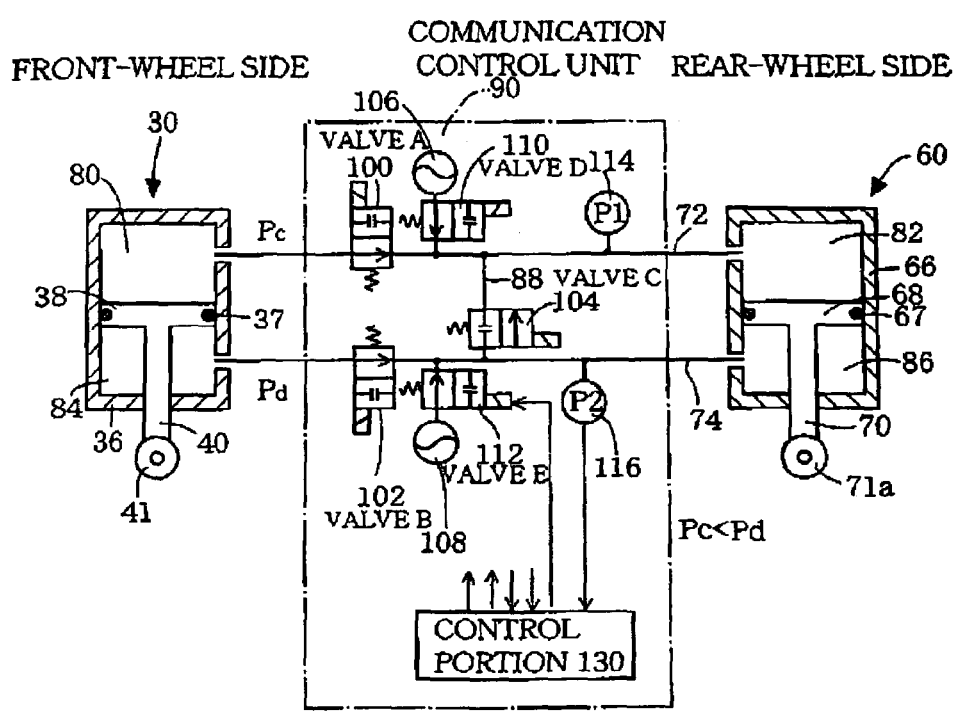
FIG. 2 is a hydraulic circuit diagram of a roll restricting device of the vehicular suspension system.

As shown in FIG. 2, the hydraulic cylinder 30 includes a housing 36, and a piston 38 fluid-tightly and slidably received within the housing 36 through a sealing member 37. The piston 38 has a piston rod 40 extending from one of its opposite surfaces. The piston rod 40 has, at its free end, a connecting portion 41 including a ball joint or a rubber bushing, and is attached at its connecting portion 41 to the intermediate rod portion 14 such that the piston rod 40 is pivotable about an axis of the intermediate rod portion 14 and is tiltable relative to the axis of the intermediate rod portion 14. The housing 36 has an connecting portion 42 at its end remote from the end through which the piston rod 40 extends, and is attached at its connecting portion 42 to a member of the vehicle body such that the housing 36 is pivotable and tiltable at the connecting portion 42 relative to the vehicle body member. Thus, the hydraulic cylinder 30 is interposed between the intermediate rod portion 14 and the vehicle body such that the piston rod 40 extends in the vertical direction and is connected to the intermediate rod portion 14.

The connecting rod 32 has a connecting portion at one end thereof, and is attached at this connecting portion to the intermediate rod portion 14 such that the connecting rod 32 is pivotable about the axis of the intermediate rod portion 14 and is tiltable relative to the axis of the intermediate rod portion 14. The connecting rod 32 has another connecting portion at the other end, and is connected at this connecting portion to a member of the vehicle body such that the connecting rod 32 is pivotable and tiltable relative to the vehicle body member.

The stabilizer bar 14 for the rear wheels is attached to a rear axle housing 50, at its connecting portions 48 which provided at respective free ends of the left and right arm portions 16, 18 and which include respective ball joints or rubber bushings. The stabilizer bar 14 is pivotable about an axis of the rear axle housing 50 and tiltable relative to the axis of the rear axle housing 50. The rear axle housing 50 accommodates rear axles which transmit a drive torque of a drive power source (not shown) of the vehicle to rear left and right drive wheels 54 through a differential 52.

The stabilizer bar 12 is also supported by suitable vehicle body members, through a hydraulic cylinder 60 at a right end section of its intermediate rod portion 14, and through a connecting rod 32 at a left end section of the intermediate rod portion 14. Like the hydraulic cylinder 30, the hydraulic cylinder 60 includes a housing 66, and a piston 68 fluid-tightly and slidably received within the housing 66 through a sealing member 67. The piston 68 has a piston rod 70 which has a connecting portion 71a at its free end, while the housing 77 has a connecting portion 71b at its end remote from the end through which the piston rod 70 extends. The hydraulic cylinder 60 is connected at its connecting portion 71a to the stabilizer bar 12, and at its connecting portion 71b to a member of the vehicle body, such that the hydraulic cylinder 60 extends in the vertical direction.

In the present embodiment constructed as described above, the stabilizer bars 10, 12 for the respective front-wheel and rear-wheel suspension systems of the vehicle are provided, at the right-side end sections of the intermediate rod portions 14, with the respective hydraulic cylinders 30, 60, such that the piston rods 40, 70 extend in the vertical direction and are connected to the respective stabilizer bars 10, 12. These two hydraulic cylinders 30, 60 have respective fluid chambers connected to each other by a fluid passage 72, and respective fluid chambers connected to each other by a fluid passage 74. A hydraulic circuit 76 is constituted by the hydraulic cylinders 30, 60, fluid passages 72, 74 and other components.

The fluid passage 72 connects the fluid chambers 80, 82 of the hydraulic cylinders 30, 60, each of which is formed on one side of the piston 38, 68 which is remote from the piston rod 40, 70, while the fluid passage 72 connects the fluid chambers 84, 86 of the hydraulic cylinders 30, 60, which are formed on the piston-rod side of the piston 38, 68. Thus, the fluid chambers 80, 82 are the mutually corresponding two fluid chambers of the hydraulic cylinders 30, 60, while the fluid chambers 84, 86 are also the mutually corresponding two fluid chambers of the hydraulic cylinders 30, 60. The mutually corresponding fluid chambers 80, 82 perform the same function, and the mutually corresponding fluid chambers 84, 86 perform the same function. Namely, a roll motion of the vehicle body causes concurrent changes (increase or decrease) in the pressures of a working fluid in the fluid chambers 80, 82, and concurrent changes in the fluid pressure in the fluid chambers 84, 86. The two fluid passages 72, 74 are connected to each other by a connecting passage 88. Since the fluid chambers 80, 82 are located above the fluid chambers 84, 86, the fluid chambers 80, 82 and the fluid chambers 84, 86 will be hereinafter referred to as "upper fluid chambers 80, 82" and "lower fluid chambers 84, 86", respectively.

In the present embodiment, there is provided a communication control unit 90 operable to control flows of the working fluid through the fluid passages 72, 74 and the connecting passage 88. The communication control unit 90 includes a control portion, a plurality of valves A-E, and accumulators.

The fluid passages 72, 74 are provided with the respective valves A and B in the form of solenoid-operated shut-off valves 100, 102, which are normally-open valves that are held in their open state while their solenoid coils are placed in their de-energized state.

The connecting passage 88 is provided with the valve C in the form of a solenoid-operated shut-off valve 104, which is a normally-closed valve that is held in its closed state while its solenoid coil is placed in its de-energized state.

The fluid passages 72, 74 are further provided with the respective accumulators 106, 108, which function to accommodate the working fluid when the fluid pressures in the fluid passages 72, 74 become higher than a predetermined upper limit, and to deliver the stored pressurized fluid to the respective fluid passages 72, 74 when the fluid pressures in the fluid passages 72, 74 become lower than a predetermined lower limit. In the present embodiment, each of the accumulators 106, 108 is connected to a portion of the corresponding fluid passage 72, 74 which is located between the corresponding shut-off valve 100, 102 and the rear-wheel-side end of the fluid passage 72, 74. The valves D and E in the form of solenoid-operated shut-off valves 110, 112 are disposed between the respective accumulators 106, 108 and the corresponding fluid passages 72, 74. The solenoid-operated shut-off valves 110, 112 are normally-open valves that are held in their open state while their solenoid coils are placed in their de-energized state.

The communication control unit 90 further includes pressure sensors 114 116. The pressure sensor 114 is connected to the fluid passage 72, while the pressure sensor 116 is connected to the fluid passage 74. The pressure sensors 114, 116 respectively detect the fluid pressure in the upper fluid chambers 80, 82 and the fluid pressure in the lower fluid chambers 84, 86, when the shut-off valves 100, 102 and 104 are placed in the states indicated in FIG. 2.

Figure 3:
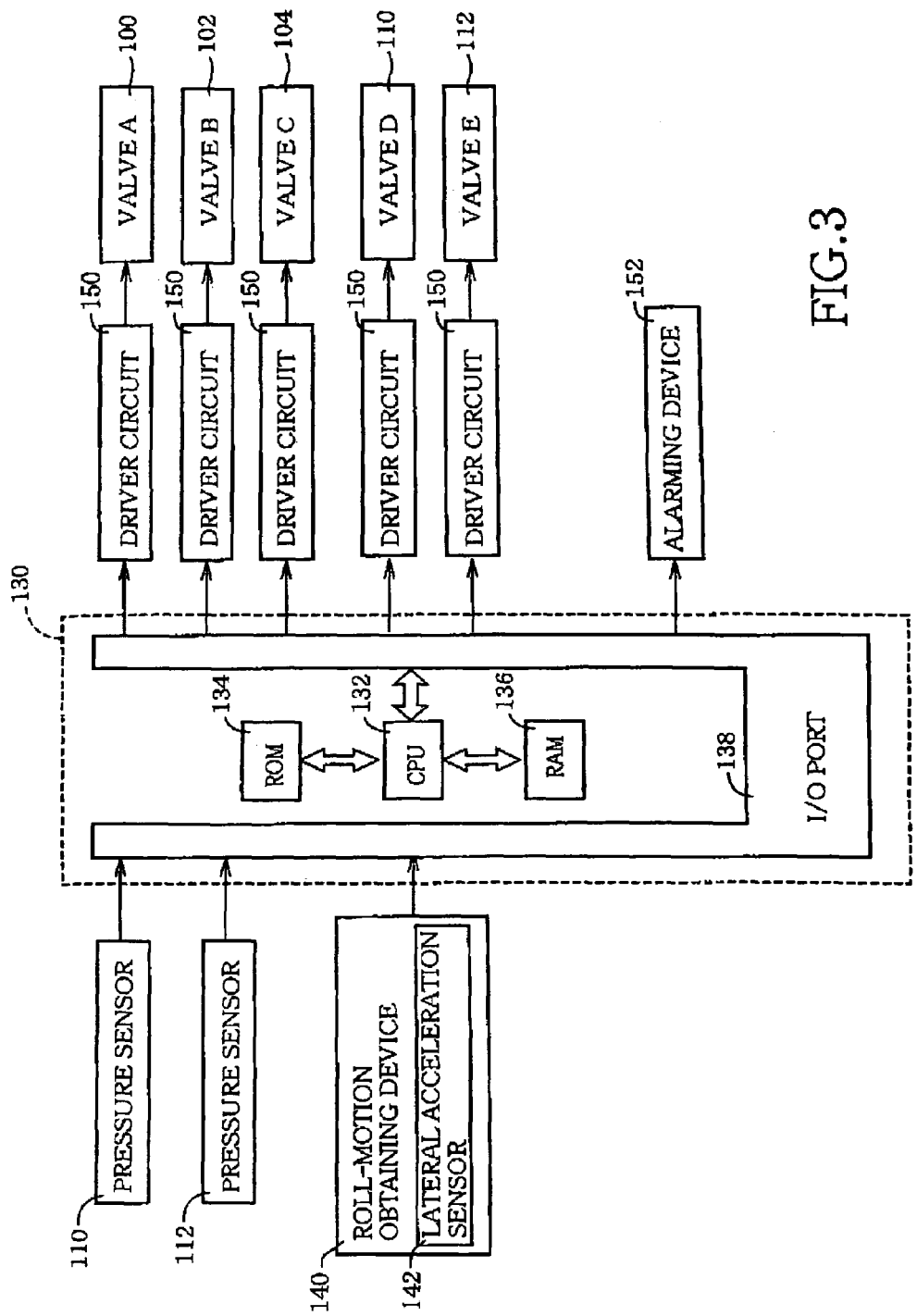
FIG. 3 is a view schematically showing a communication control unit of the roll restricting device.
Figure 4:
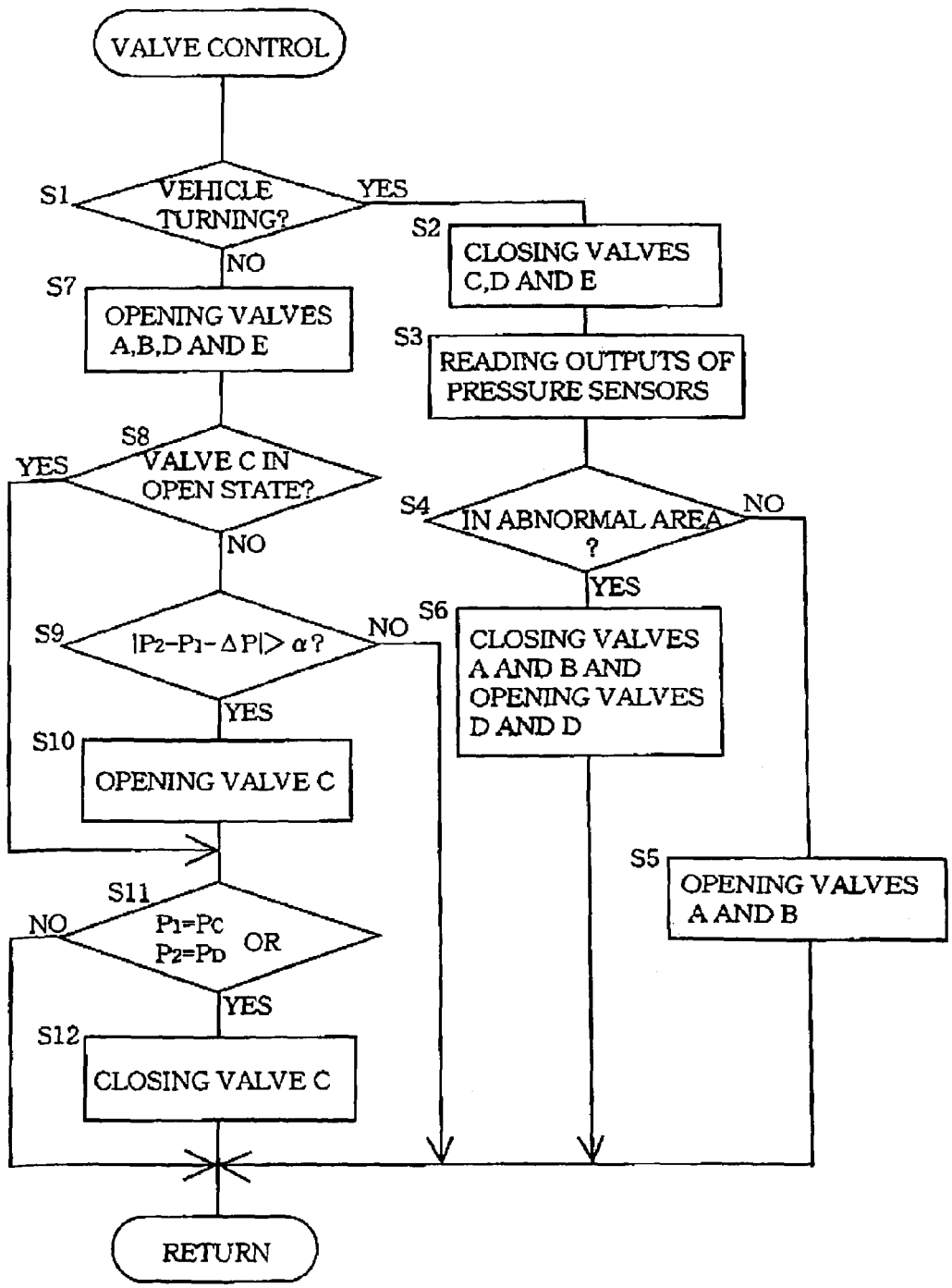
FIG. 4 is a flow chart illustrating a valve control program stored in a ROM of the flow control unit.

The communication control unit 90 further includes a control portion 130 which is principally constituted by a computer. As indicated in FIG. 3, the control portion 130 incorporates a CPU 132, a ROM 134, a RAM 137, and an input/output portion 138. To the input/output portion 138, there are connected the above-described pressure sensors 114, 116, a roll-motion obtaining device 140, and other elements. The roll-motion obtaining device 140 includes a lateral acceleration sensor 142 operable to detect an acceleration value of the vehicle in its lateral direction. The ROM 134 stores a valve control program illustrated in the flow chart of FIG. 4, a data table indicated in the graph of FIG. 5, etc. To the input/output portion 138, there are also connected the valves A-E (solenoid-operated shut-off valves 100, 102, 104, 110, 112) through respective driver circuits 150, and an alarming device 152. The alarming device 152 may include a light, an audio output device, or a display device, so that the alarming device 152 informs the operator of the vehicle of any abnormality, by illumination or flickering of the light, a voice message or a display.

While the vehicle is running straight, the solenoid-operated shut-off valves 100, 102, 104, 110, 112 (valves A-E) are placed in the original states indicated.

The fluid pressures detected by the pressure sensors 110 and 112 are substantially held at predetermined values Pc, Pd, respectively. In this respect, it is noted that the fluid pressure Pc in the upper fluid chambers 80, 82 detected by the pressure sensor 114 is lower than the fluid pressure Pd in the lower fluid chambers 84, 86 detected by the pressure sensor 116. That is, an effective pressure-receiving surface area of the piston 38, 68 which partially defines the upper fluid chamber 80, 82 is larger than that which partially defines the lower fluid chamber 84, 86, so that the fluid pressure in the lower fluid chambers 84, 86 is higher than that in the upper fluid chambers 80, 82 during a straight running of the vehicle (without application of an external added force to the piston 38, 68). The piston 38, 68 of each hydraulic cylinder 30, 60 is held at a position of equilibrium at which two forces acting on the piston 38, 68 in the respective opposite directions are equal to each other, so that the vehicle body is held substantially horizontal, without any torsion of the stabilizer bars 10, 12.

While the vehicle is cornering or turning, the solenoid-operated shut-off valves 100, 102 (valves A and B) are placed in their open state, and the solenoid-operated shut-off valves 104, 110, 112 (valves C, D and E) are placed in their closed state.

While the vehicle is turning right, the vehicle body is inclined due to a centrifugal force such that the vehicle body has a lower level or height on the outer side of a turning path, namely, on the left side of the vehicle. As a result, the fluid pressure in the upper fluid chambers 80, 82 of the hydraulic cylinders 30, 60 is lowered, while the fluid pressure in the lower fluid chambers 84, 86 is raised. When the two upper fluid chambers 80, 82 are communicated with to each other through the fluid passage 72, while the two lower fluid chambers 84, 86 are communicated with each other through the fluid passage 74, the fluid pressures in the upper fluid chambers 80, 82 are substantially equal to each other while the fluid pressures in the lower fluid chambers 84, 86 are substantially equal to each other, so that that an inclination of the turning vehicle body causes substantially no flows of the fluid between the upper fluid chambers 80, 82, and no flows of the fluid between the lower fluid chambers 84, 86. The inclination of the intermediate rod portions 14 of each stabilizer bar 10, 12 is restricted, and the stabilizer bars 10, 12 are subjected to torsional loads, with a result of generation of torsional resilient forces, namely, restoring forces which act on the vehicle body and the left wheels in opposite direction directions away from each other, and restoring forces which act on the vehicle body and the right wheels in opposite directions toward each other, whereby the angle of inclination of the vehicle body during the right turning of the vehicle is restricted.

A difference between the fluid pressure in the upper fluid chambers 80 82 and the fluid pressure in the lower fluid chambers 84, 85 during the right turning of the vehicle increases with an increase in the forces acting on the pistons 38, 68 of the hydraulic cylinders 30, 60. For example, the fluid pressure difference increases with an increase in the centrifugal force acting on the turning vehicle body. The fluid pressure difference has a known relationship with the centrifugal force. Further, the fluid pressure in the upper fluid chambers 80, 82 and the fluid pressure in the lower fluid chambers 84, 86 have a substantially constant relationship with each other. Accordingly, the centrifugal force (a force causing an inclination of the vehicle body) has a substantially constant relationship with the fluid pressure in the upper fluid chambers 80, 82 or the fluid pressure in the lower fluid chambers 84, 86. In the present embodiment, the control portion stores a data table representative of a predetermined relationship between the lateral acceleration value detected as a quantity relating to the centrifugal force and the higher one of the fluid pressures in the fluid passages 72, 74.

While the vehicle is turning left, the vehicle body is inclined due to a centrifugal force such that the vehicle body has a lower level or height on the outer side of a turning path, namely, on the right side of the vehicle. As a result, the fluid pressure in the lower fluid chambers 84, 86 of the hydraulic cylinders 30, 60 is lowered, while the fluid pressure in the upper fluid chambers 80, 82 is raised. In this case, too, the fluid flows through the fluid passages 72, 74 are restricted, and the distance of vertical movement of the piston 38, 68 is limited, so that the stabilizer bars 10, 12 are subjected to torsional loads, with a result of generation of torsional resilient forces.

The present embodiment is arranged to detect a rolling state of the vehicle during turning of the vehicle, in which each hydraulic cylinder 30, 60 has a fluid pressure difference.

If the higher one of the fluid pressures in the fluid passages 72, 74 is lower than a lower limit determined by the detected lateral acceleration value during turning of the vehicle, it is possible to estimate or determine that at least one of the fluid passages 72, 74 and the hydraulic cylinders 30, 60 suffers from a leakage of the fluid. In the event of determination that a fluid leakage occurs at one of the fluid passages 72, 74 and hydraulic cylinders 30, 60, both of the solenoid-operated shut-off valves 100, 102 are switched to the closed state, so that the one of the hydraulic cylinders 30, 60 which suffer from the fluid leakage, or a portion of the fluid passage 72, 74 which is located between one of the hydraulic cylinders 30, 60 and which suffers from the fluid leakage, is disconnected or shut off from the other hydraulic cylinder 30, 60, whereby the hydraulic circuit 76 is separated into two parts. In this respect, it is noted that a fluid pressure difference may arise between the two fluid chambers 80, 82, or 84, 86 on the opposite sides of the piston of the above-indicated other hydraulic cylinder 30, 60, so that one of the stabilizer bar 10 for the front wheels and the stabilizer bar 12 for the rear wheels can normally generate a torsional resilient force which restricts or limits an angle of inclination of the vehicle body. Thus, a normal roll-motion restricting function of either one of the two cylinders 30, 60 permits significant reduction of the deterioration of an overall roll-motion restricting function of the suspension system, as compared with the degree of deterioration where both of the two hydraulic cylinders 30, 60 were disabled to perform their normal roll-motion restricting functions.

Where the front right wheel and the rear left wheel are located at higher positions than the front left wheel and the rear right wheel during running of the vehicle on a considerably undulating roadway surface, for example, the fluid pressure in the lower fluid chamber 84 of the hydraulic cylinder 30 located relatively close to the front right wheel is lowered while the fluid pressure in the lower fluid chamber 86 of the hydraulic cylinder 60 located relatively close to the rear right wheel is raised, and the fluid pressure in the upper fluid chamber 82 of the hydraulic cylinder 30 is raised while the fluid pressure in the upper fluid chamber 86 of the hydraulic cylinder 60 is lowered. As a result, the fluid is permitted to flow through the fluid passages 72, 74 while the shut-off valves 100, 102 are held in the open state, permitting free inclination of the stabilizer bars 10, 12 without torsional deformation.

During straight running of the vehicle, the upper fluid chambers and the lower fluid chambers, that is, the fluid passages 72, 74 have the predetermined fluid pressures, as described above.

During turning of the vehicle, on the other hand, the fluid may leak from a higher-pressure one of the upper and lower fluid chambers 80, 84 of the hydraulic cylinder 30 to the other fluid chamber 80, 84, and from a higher-pressure one of the upper and lower fluid chambers 82, 86 of the hydraulic cylinder 60 to the other fluid chamber 82, 86, through a gap between the sealing member 37, 67 and the inner housing surface, when there arises a considerably large fluid pressure difference between the upper and lower fluid chambers 80, 84 or between the upper and lower fluid chambers 82, 86, or when the sealing member 37, 67 is defective. In this case, the fluid pressures in the fluid passages 72, 74 after the vehicle returns from the turning state to the straight running state would deviate from the predetermined values Pc, Pd. This causes the stabilizer bars 10, 12 to generate torsional resilient forces tending to cause inclination of the vehicle body even after the vehicle has returned to its straight running state. In view of this drawback, the present embodiment is arranged to open the solenoid-operated shut-off valve 104 when the fluid pressure in the fluid passage 74 is higher by more than a predetermined amount than the fluid pressure in the fluid passage 72, during straight running of the vehicle, that is, while it is estimated that the vehicle body has a substantially horizontal attitude. The shut-off valve 104 is opened so that the fluid pressures in the fluid passages 72, 74 become equal to the predetermined nominal values Pc, Pd.

A determination as to whether the vehicle is turning or not is made in step S1 (abbreviated as S1, the abbreviation applying to the other steps). In the present embodiment, this determination in S1 is made by determining whether the lateral acceleration value of the vehicle detected by the lateral acceleration sensor 146 is higher than a predetermined threshold value Gs. The threshold value Gs, which may be a comparatively small value, is determined to permit the determination as to whether the vehicle is turning or running straight.

When the detected lateral acceleration value G is higher than the threshold value Gs, the control flow goes to S2 to close the solenoid-operated shut-off valves 104, 110 and 112 (valves C, D and E). Then, S3 is implemented to read the fluid pressures detected by the pressure sensors 114, 116, and S3 is implemented to determine whether a relationship between the detected lateral acceleration value G and the higher one of the detected fluid pressures lies in a predetermined normal or abnormal area represented by the data table of FIG. 5. If the relationship lies in the predetermined normal area, a negative decision (NO) is obtained in S4, and the control flow goes to S5 to open the solenoid-operated shut-off valves 100, 102 (valves A and B). If the relationship lies in the predetermined abnormal area, an affirmative decision (YES) is obtained in 54, and the control flow goes to 56 to close the solenoid-operated shut-off valves 100, 102 and open the solenoid-operated shut-off valves 110, 112, so that the two hydraulic cylinders 30, 60 are isolated or disconnected from each other, making it possible to restrict a roll motion of the vehicle body, even in the event of a fluid leakage at one of the hydraulic cylinders 30, 60 due to torsional deformation of the corresponding stabilizer bar.

When the above-indicated relationship lies in the abnormal area, the alarming device 152 is activated to inform the vehicle operator that the relationship is abnormal.

When the detected lateral acceleration value G is not higher than the threshold value Gs, that is, if it is determined that the vehicle is running substantially straight, a negative decision (NO) is obtained in S1, and the control flow goes to S7 to open the solenoid-operated shut-off valves 100, 102, 110 and 112. Then, the control flow goes to S8 to determine whether the solenoid-operated shut-off valve 104 (valve C) is placed in the open state. When the shutoff valve 104 is placed in the closed state, a negative decision (NO) is obtained in S8, and the control flow goes to step S9 to determine whether an absolute value |P2−P1−ΔP| is larger than a predetermined value α, where P2, P1 and ΔPθ respectively represent the fluid pressure in the fluid passage 72, the fluid pressure in the fluid passage 72, and a difference between the fluid pressures P1, P2 in the fluid passages 72, 74 at the neutral position of the piston 38, 68 of the hydraulic cylinder 30, 60, which difference arises from a difference between the pressure-receiving surface areas of the piston 38, 68 which partially define the respective fluid chambers 80, 84 or the respective fluid chambers 82, 86.

If the above-indicated absolute value is larger than the predetermined value α, an affirmative decision (YES) is obtained in S9, the control flow goes to S10 to open the solenoid-operated shut-off valve 104, so that the fluid flows from the higher-pressure one of the two fluid chambers into the other fluid chamber, whereby the fluid pressure difference is reduced. The shut-off valve 104 is held in the open state until the fluid pressure in the fluid passage 72, 74 has become equal to the predetermined value Pc, Pd. When the fluid pressure in the fluid passage 72, 74 has become equal to the predetermined value Pc, Pd, an affirmative decision (YES) is obtained in S11, and the control flow goes to S12 to close the shut-off valve 104. The above-indicated ΔP is a value corresponding to the difference between the predetermined values Pc, Pd.

In the embodiment described above, an abnormality of the suspension system is detected on the basis of the relationship between the lateral acceleration value G and the fluid pressure in the fluid passage 72, 74. However, the suspension system may be diagnosed on the basis of a relationship between the fluid pressure and a yaw rate of the vehicle body, a relationship between the fluid pressure and a steering angle of the vehicle, or a relationship between the fluid pressure and an attitude of the vehicle body. The attitude of the vehicle body may be obtained on the basis of outputs of height sensors disposed at respective positions corresponding to the respective wheels. It is noted that a rate of change of the vehicle body attitude and an acceleration value of the change may be obtained on the basis of a first derivative and a second derivative of the output of each height sensor.

Figure 6:
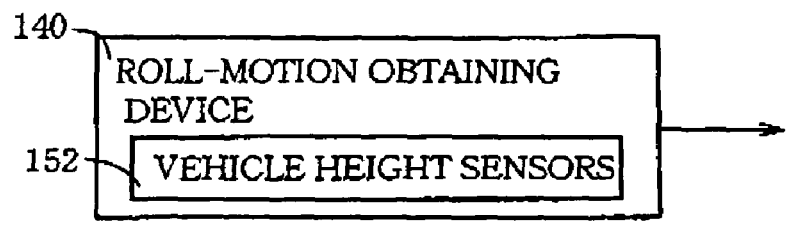
FIG. 6 is a view schematically showing a portion of another communication control unit of the roll restricting device.
Figure 7:
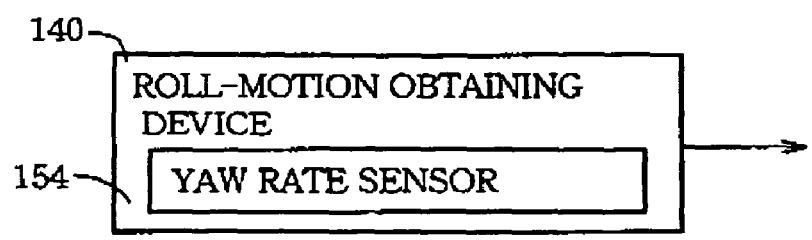
FIG. 7 is a view schematically showing a portion of a further communication control unit of the roll restricting device.
Figure 8:
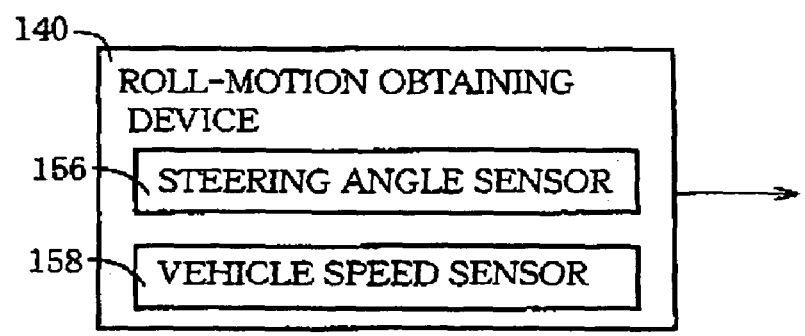
FIG. 8 is a view schematically showing a portion of a still further communication control unit of the roll restricting device.
Figure 9:
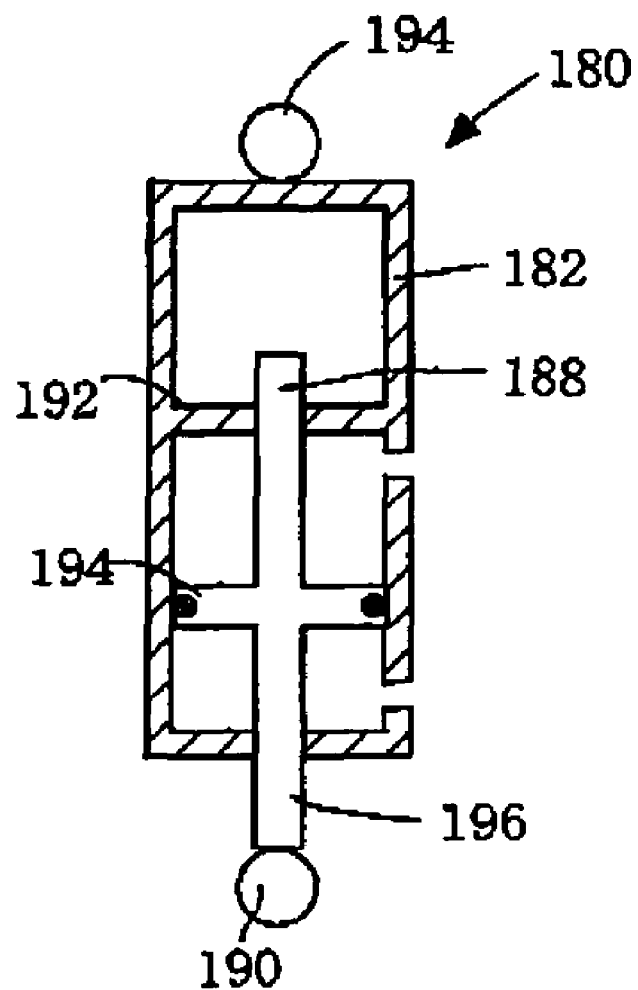
FIG. 9 is a view showing a modification of a hydraulic cylinder included in the roll restricting device.

Depending upon the relationship used, the roll-motion obtaining device 140 includes vehicle height sensors 153 corresponding to the respective wheels, as shown in FIG. 6, a yaw rate sensor 154 as shown in FIG. 7, or a steering angle sensor 156 and a vehicle speed sensor 158 as shown in FIG. 8. The steering angle sensor 156 is arranged to detect a steering angle of a steering wheel of the vehicle. Alternatively, the roll-motion obtaining device 140 body. The roll-motion obtaining device 140 may include a plurality of sensors as indicated above. The roll value can be obtained by integrating the roll rate, and an acceleration value of the roll motion can be obtained by differentiating the roll rate.

The memory portion of the control portion 130 stores the selected relationship, for example, a relationship between the yaw rate γ and the fluid pressure, a relationship between the steering angle of the steering wheel or the steering angle of the front or rear wheels and the fluid pressure, or a relationship between the vehicle body attitude and the fluid pressure. It is noted that the centrifugal force and therefore the fluid pressure increase with an increase in the steering angle θ of the steering wheel or the steering angle of the front or rear wheels (a decrease in the turning radius of the vehicle) and with an increase in the running speed of the vehicle. The attitude of the vehicle body during running of the vehicle may be estimated on the basis of the steering angle of the steering wheel, the steering angle of the front wheels, or the yaw rate, as described above, and the attitude while the vehicle is stationary may be estimated on the basis of the outputs of the vehicle height sensors 153 disposed at the respective positions corresponding to the wheels.

Accordingly, the determination as to whether the vehicle is turning or running straight may be made on the basis of the yaw rate, the steering angle of the steering wheel, or the steering angle of the front or rear wheels.

While the embodiment described above is arranged to diagnose the suspension system on the basis of the relationship between the lateral acceleration value G and the higher one of the fluid pressures in the two fluid passages 72, 74, the suspension system may be diagnosed on the basis of a relationship between the lateral acceleration value G and a difference between the fluid pressures in the two fluid passages 72, 74. Similarly, the diagnosis may be effected on the basis of a relationship between this fluid pressure difference and any one of the yaw rate, steering angle, roll-related parameters, etc. which have been described.

Further, the solenoid-operated shut-off valve 104 may be opened when it is determined on the basis of the outputs of the vehicle height sensors 153 that the fluid pressure difference of the fluid passages 72, 74 is equal to or larger than a predetermined value (that the vehicle body does not have a horizontal attitude) during straight running of the vehicle.

Where the diameter of the piston rods 40, 70 is considerably smaller than that of the pistons 38, 68 of the hydraulic cylinders 30, 60, the fluid pressures in the upper and lower chambers on the opposite sides of the piston 38, 68 can be considered almost equal to each other when the vehicle body is substantially horizontal. In this case, the solenoid-operated shut-off valve 104 may be held open while the vehicle is running straight. In this case, the shut-off valve 104 may be a normally-open valve.

Each of the hydraulic cylinders may be replaced by a hydraulic cylinder provided with a piston having two piston rods extending in the opposite directions. Referring to FIG. 6, there is shown an example of this hydraulic cylinder 180, which includes a housing 182, and a piston 184 which is fluid-tightly and slidably received within the housing 182 and which has two piston rods 186, 188 extending therefrom in the respective opposite directions. The piston rod 186 extends through the housing 182, and is connected at its connecting portion 190 to the stabilizer bar. The piston rod 188 fluid-tightly and slidably extends through a guiding portion 192 formed within the housing 182, but does not extends through the housing 182. The housing 182 has a connecting portion 194 to be fixed to a member of the vehicle body.

The stabilizer bar 10 for the front wheels and the stabilizer bar 12 for the rear wheels may be connected in the same manner, to the vehicle body. Further, the hydraulic cylinders may be disposed so as to extend in the horizontal direction, rather than in the vertical direction. In any case, the orientation of the hydraulic cylinders is determined by the relative position between the stabilizer bars 10, 12 and the vehicle body members by which the stabilizer bars are supported, and the corresponding two fluid chambers of one pair of the two hydraulic cylinders are connected to each other by one fluid passage, while the corresponding two fluid chambers of another pair of the two hydraulic cylinders are connected to each other by another fluid passage.

While the valves A-E used in the above-described embodiment are solenoid-operated shut-off valves which are opened and closed by application and removal of an electric current, at least one of the valves A-E may be replaced by a solenoid-operated control valve capable of controlling a fluid pressure difference on the opposite sides thereof according to a controlled amount of electric current applied thereto. Each of the valves A-E may be arranged as desired, provided it is operable between an open state and a closed state for respectively permitting and inhibiting a fluid flow therethrough.

Further, at least one of the valves A-C (solenoid-operated shut-off valves 100, 102, 104) need not be a solenoid-operated valve. For example, the solenoid-operated shut-off valves 100, 102 (valves A and B) may be replaced by pilot-operated valves which are operated according to a difference between the fluid pressures in the fluid passages 72, 74, such that the pilot-operated valves are held open while the fluid pressure difference is equal to or higher than a predetermined value. These pilot-operated valves may be normally-closed or normally-open valves.

Further, a pressure sensor may be disposed between the accumulator 106 and the solenoid-operated shut-off valve 110 (valve D), and between the accumulator 108 and the solenoid-operated shut-off valve 112 (valve E).

While the embodiment described above uses the five solenoid-operated shut-off valves 100, 102, 104, 110, 112, the provision of all of these five solenoid-operated shut-off valves is not essential. Where the solenoid-operated shut-off valves 100, 102 are provided, it is possible to reduce the degree of deterioration of the roll-motion restricting effect upon detection of a fluid leakage, even in the absence of the solenoid-operated shut-off valve 104. Where the solenoid-operated shut-off valve 104 is provided, it is possible to reduce the degree of discomfort as felt by the vehicle operator during straight running of the vehicle, even in the absence of the solenoid-operated shut-off valves 100, 102. In this case, some amounts of fluid flow may take place between the accumulators 106, 108 and the fluid passages 72, 74 due to variations in the fluid pressures in the fluid passages during turning of the vehicle, and the pistons 38, 68 may be more or less moved in the hydraulic cylinders 30, 60.

When the distances of movements of the pistons 38, 68 are substantially equal to each other and comparatively small, however, the angles of inclination of the intermediate rod portions 14 of the stabilizer bars 10, 12 are restricted, so that the stabilizer bars are subject to torsional loads, and generate torsional resilient forces.

In the above-described embodiment, the accumulators 106, 108 are connected to portions of the fluid passages 72, 74 which are located on the rear-wheel side of the solenoid-operated shut-off valves 100, 102. However, additional accumulators may be connected to portions of the fluid passages 72, 74 which are located on the front-wheel side of the solenoid-operated shut-off valves 100, 102. The provision of the front-wheel-side accumulators makes it possible to prevent application of an excessive force to the piston 38 of the front-wheel-side hydraulic cylinder 30 when the solenoid-operated shut-off valves 100, 102 are placed in the closed state. Further, the provision of the accumulators 106, 108 is not essential.

Although the roll-motion restricting device of the vehicular suspension system according to the above-described embodiment is operated with a hydraulic pressure, the roll-motion restricting device may be operated with a highly compressible gas (e.g., highly pressurized air).

There will next be described a vehicular suspension system according to another embodiment of this invention. The present vehicular suspension system is not provided with stabilizer bars, and includes a roll-motion restricting device. While the suspension system include a large number of elements, those elements which do not relate to the present invention will not be described.

Figure 10:
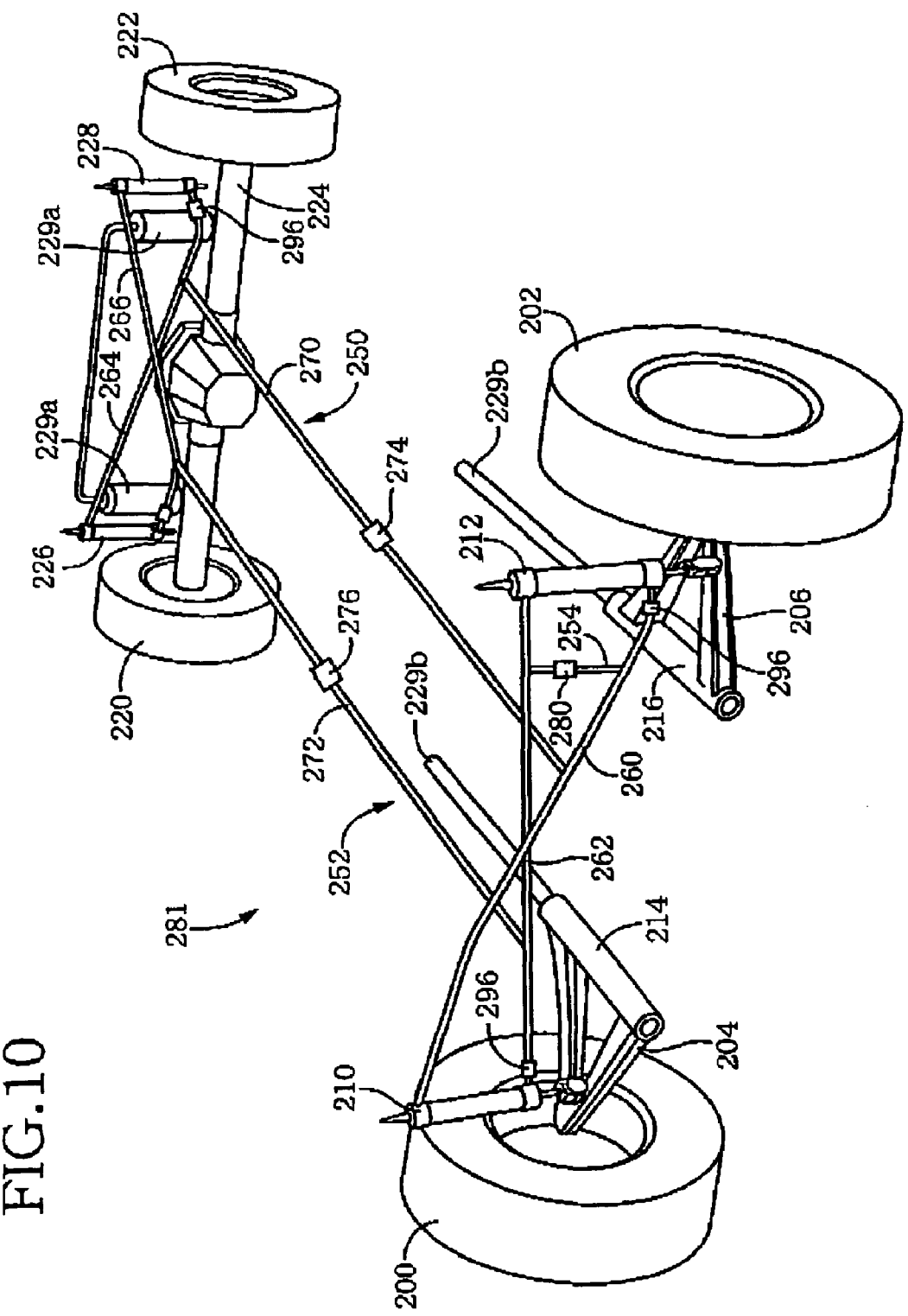
FIG. 10 is a view schematically showing a vehicular suspension system according to another embodiment of this invention.
Figure 11:
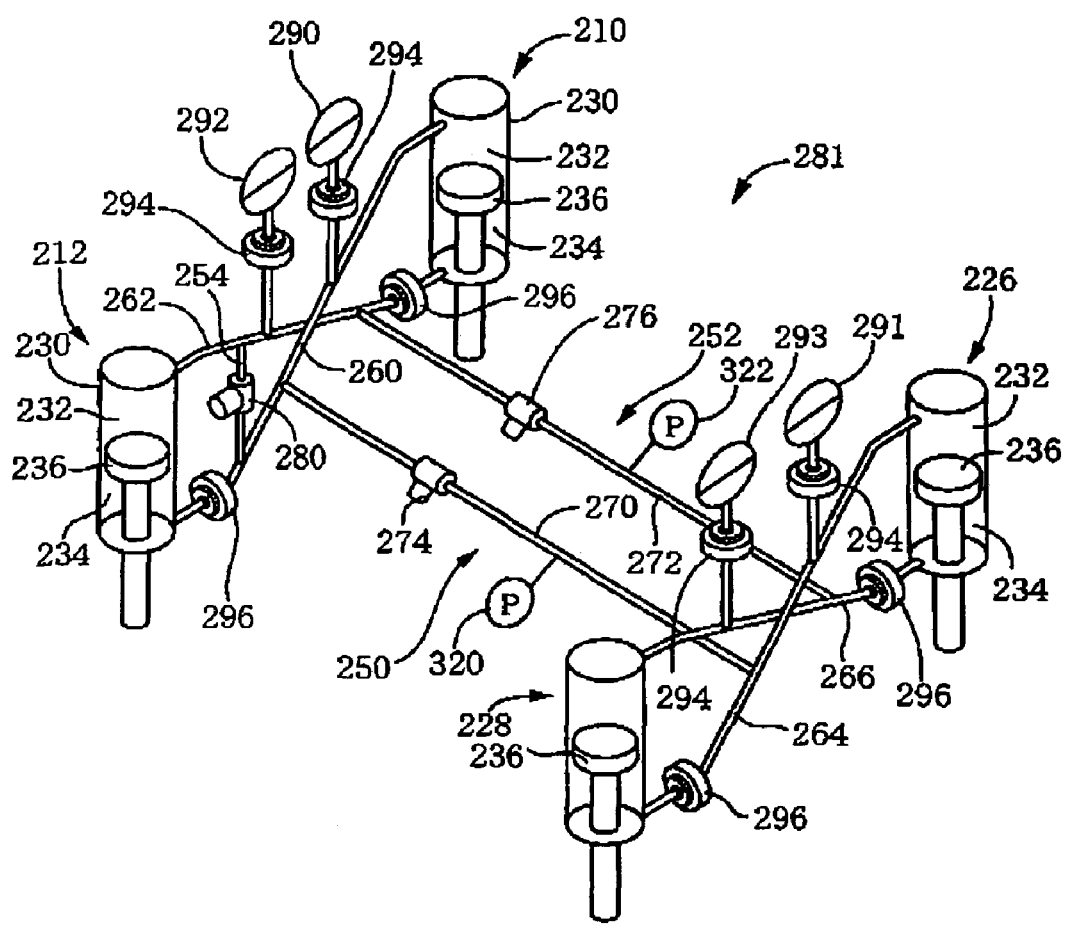
FIG. 11 is a hydraulic circuit diagram of a roll restricting device of the vehicular suspension system of FIG. 10.
Figure 12:
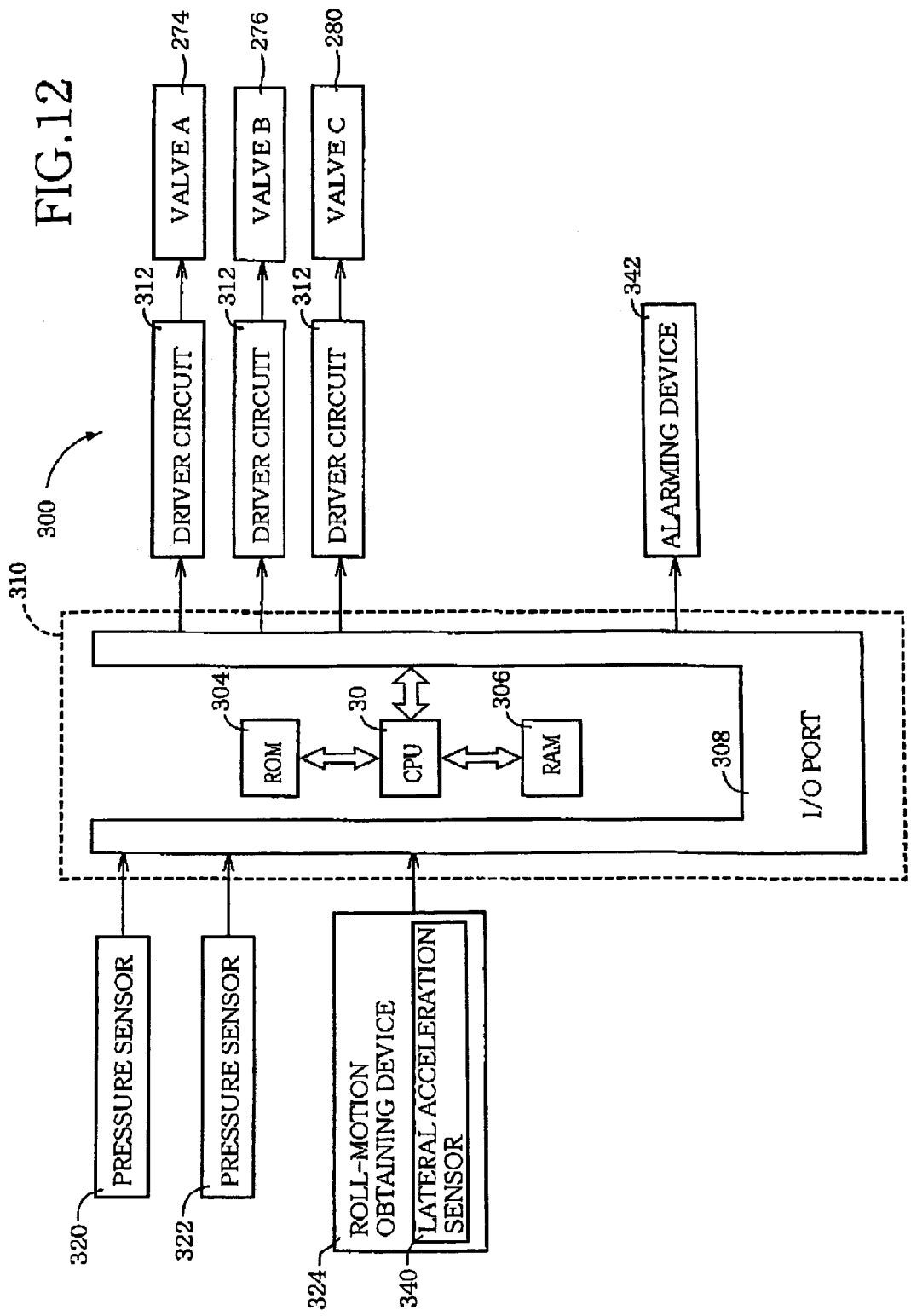
FIG. 12 is a view schematically showing a communication control unit of the roll restricting device of FIG. 11.

Referring to FIGS. 10 and 11, hydraulic cylinders 210, 212 corresponding to respective front right and left wheels 200, 202 are disposed between respective suspension arms in the form of lower arms 204, 206 and respective vehicle body members. The lower arms 204, 207 are flexibly supported at their connecting portions 214, 216 by the vehicle body members.

Hydraulic cylinders 226, 228 corresponding to respective rear right and left wheels 220, 222 are disposed between an axle housing 224 and respective vehicle body members.

Reference sign 229a denotes air chambers, while reference sign 229b denotes torsion bars. Each torsion bar 229b is connected at one end thereof to the above-described connecting portion 214, 216, and at the other end to a vehicle body member. The torsion bar 229b generates a torsional resilient force upon torsional deformation thereof, so that a roll motion of the vehicle body is restricted by the generated torsional resilient force. However, the provision of the torsion bars 229b is not essential. Further, the torsion bars 229b may be disposed so as to connect the front right and left wheels, so that the torsion bars 229b function as stabilizer bars. The torsion bars may be provided for not only the front wheels but also the rear wheels.

Each of these hydraulic cylinders 210, 212, 226, 228 extends in the vertical direction of the vehicle, and includes a housing 230, and a piston 236 which divides an interior space of the housing 230 into two fluid chambers 232, 234. In this embodiment, the housing 230 is connected to a vehicle body member, while a piston rod of the piston 236 is connected to a wheel-side member. Namely, the housing 230 of the hydraulic cylinders 210, 212 corresponding to the front wheels is connected to the lower arm 204, 206, while that of the hydraulic cylinders 226, 228 corresponding to the rear wheels is connected to the axle housing 224. In each of the hydraulic cylinders 210, 212, 226, 228, the fluid chamber partially defined by the upper surface of the piston 236 is a fluid chamber 232, and the fluid chamber partially defined by the lower surface of the piston 236 is a fluid chamber 234.

In the present embodiment, the fluid chambers 232, 234 of the four hydraulic cylinders consist of one group of corresponding fluid chambers connected to each other and another group of corresponding fluid chambers connected to each other. When the vehicle has a roll motion, the fluid pressures in the corresponding fluid chambers of one of the two groups are all raised, while the fluid pressures in the corresponding fluid chambers of the other group are all lowered. Namely, the upper fluid chambers 232 of the hydraulic cylinders 210, 226 respectively corresponding to the front and rear right wheels, and the lower fluid chambers 234 of the hydraulic cylinders 212, 228 respectively corresponding to the front and rear left wheels are the corresponding fluid chambers connected to each other by a fluid passage 250. Similarly, the lower fluid chambers 234 of the hydraulic cylinders 210, 226 corresponding to the front and rear right wheels, and the upper fluid chambers 232 of the hydraulic cylinders 212, 228 corresponding to the front and rear left wheels are the corresponding fluid chambers connected to each other by a fluid passage 252. Those fluid passages 250, 252 are connected to each other by a connecting passage 254.

The fluid passage 250 includes a first fluid passage 260 connecting the corresponding fluid chambers of the hydraulic cylinders 210, 212 corresponding to the respective front right and left wheels, a second fluid passage 264 connecting the corresponding fluid chambers of the hydraulic cylinders 226, 228 corresponding to the rear right and left wheels, and a third fluid passage 270 connecting the first and second fluid passages 260, 264. The fluid passage 252 includes a first fluid passage 262 connecting the corresponding fluid chambers of the hydraulic cylinders 210, 212 corresponding to the respective front right and left wheels, a second fluid passage 266 connecting the corresponding fluid chambers of the hydraulic cylinders 226, 228 corresponding to the rear right and left wheels, and a third fluid passage 272 connecting the first and second fluid passages 262, 266.

The third fluid passages 270, 272 are provided with respective cut-off valves 272, 276, while the connecting passage 254 is provided with a communication control valve 280. In the present embodiment, a hydraulic circuit 281 is constituted by the hydraulic cylinders 210, 212, 226, 228, fluid passages 250, 252, 254, cut-off valves 274, 276, communication control valve 280, and other components.

The cut-off valves 274, 276 and communication control valve 280 are solenoid-operated valves, and correspond to the valves A, B and C shown in FIG. 2. The valves A-C are solenoid-operated shut-off valves which are opened and closed by application and removal of an electric current to their solenoid coils. When the cut-off valves 274, 276 are placed in the closed state, the hydraulic circuit 281 is separated into a part (front-wheel-side part) including the hydraulic cylinders 210, 212 and a part (rear-wheel-side part) including the hydraulic cylinders 226, 228. The communication control valve 280 has an open state and a closed state for respectively permitting and inhibiting fluid communication between the two fluid passages 250, 252.

The fluid passages 260, 262 are provided with respective accumulators 290, 292, while the fluid passages 264, 266 are provided with respective accumulators 291, 293. The accumulators 290-293 permit flows of the working fluid between the accumulators and the fluid passages 250, 252, so as to prevent an excessive rise of the fluid pressures in the fluid passages 250, 252, and a drop of the fluid pressures to a negative level.

Damper valves 294 are disposed between the respective accumulators 290-293 and the corresponding fluid passages 250, 252, while damper valves 296 are disposed at respective portions of the fluid passages 250, 252 which are relatively near the fluid chambers 234 of the hydraulic cylinders 210, 212, 226, 228. The damper valves 294, 296 have a flow restricting or throttling function to provide a resistance to a flow of the fluid therethrough and thereby exhibit an effect of damping a pressure pulsation of the fluid.

The damper valves 294, 296 may have any desired arrangement, provided they have a throttling function. For example, the damper valves are solenoid-operated valves having a constant or variable throttling effect. The damper valves in the form of the solenoid-operated valves may be solenoid-operated shut-off valves which are opened and closed by application and removal of an electric current, or solenoid-operated control valves a throttling effect (a cross section area of fluid flow) of which is controllable according to an amount of electric current applied thereto. Each damper valves may have a throttling function with respect to a fluid flow in only one of the opposite directions between the corresponding fluid passage 250, 252 and accumulator 290, 292 or fluid chamber 234, or with respect to fluid flows in both of the opposite directions. Additional damper valves may be disposed near the fluid chambers 232.

Like the suspension system according to the above-described preceding embodiment, the present suspension system includes a communication control unit 300. The communication control unit 300 includes a control portion 310 incorporating a CPU 302, a ROM 304, a RAM 306 and an input/output portion 308, and further includes the valves A, B and C, driver circuits 312, pressure sensors 320, 322, and a roll-motion obtaining device 324. The pressure sensors 320, 322 are connected to the respective fluid passages 250, 252. As in the preceding embodiment, the roll-motion obtaining device 324 includes a lateral acceleration sensor 340. To the control portion 310, there are connected the communication control valve 280 (valve C) and the cut-off valves 274, 276 (valves A and B) through the respective driver circuits 312, and an alarming device 342.

Figure 5:
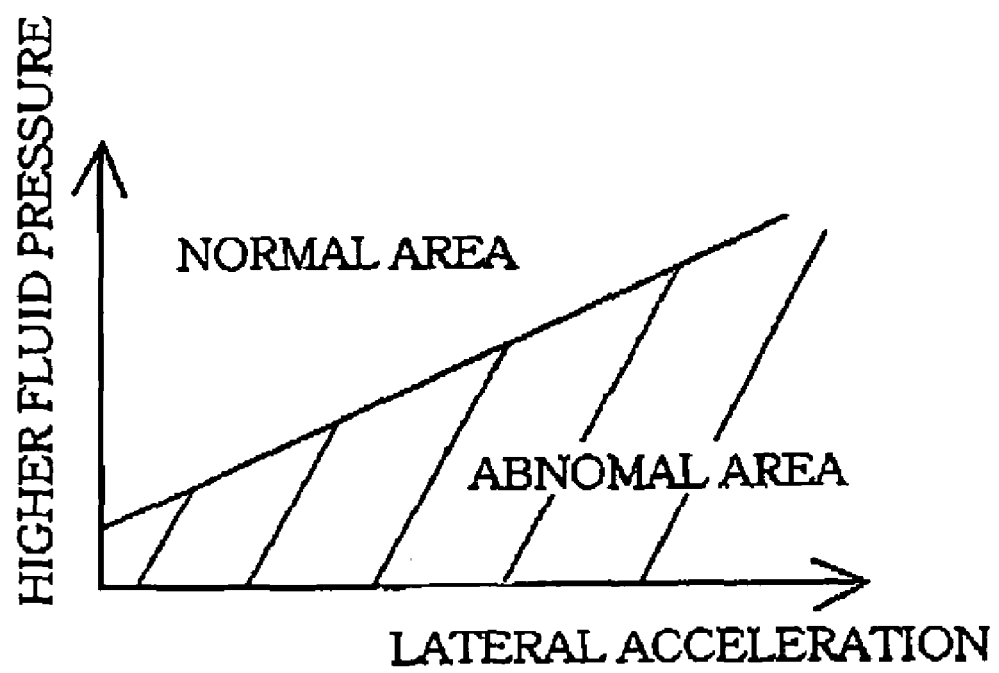
FIG. 5 is a view indicating a data table stored in the ROM of the communication control unit.
Figure 13:
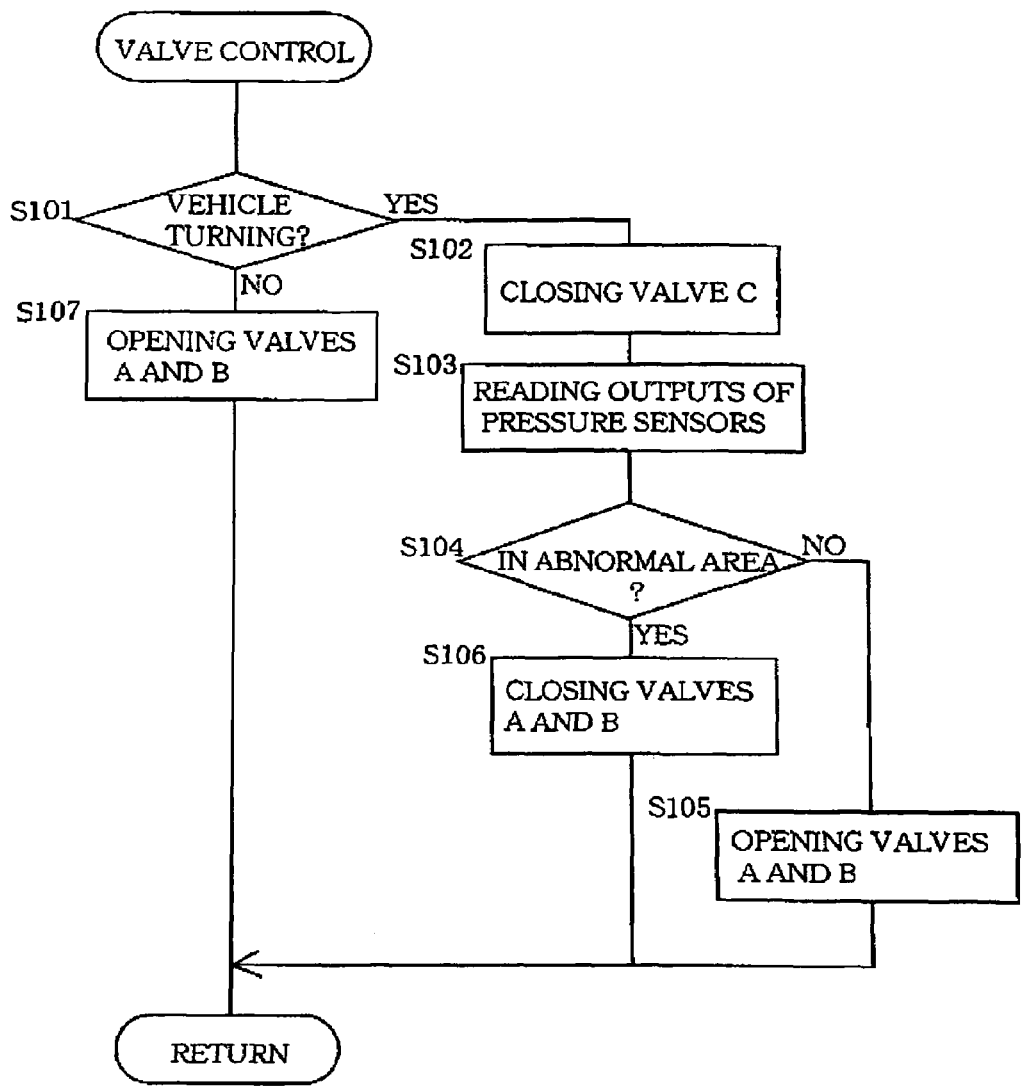
FIG. 13 is a flow chart illustrating a valve control program stored in a ROM of the communication control unit of FIG. 12.

The ROM 304 stores a data table similar to that indicated in FIG. 5, and a valve control program illustrated in the flow chart of FIG. 13.

When one of the four wheels is displaced in the vertical direction relative to the vehicle body while the cut-off valves 274, 276 are placed in the open state and while the communication control valve 280 is placed in the closed state, the fluid flows take place between the two fluid chambers of the hydraulic cylinder corresponding to that wheel, and the accumulators located near that hydraulic cylinder, namely, the accumulators 290, 292 when the wheel in question is one of the front wheels, or the accumulators 291, 293 when the wheel in question is one of the rear wheels. The fluid flows permit a vertical displacement of the wheel in question relative to the vehicle body. In this event, the fluid flows have a very small influence on the other wheels. Further, the damper valves 294, 296 exhibit a pressure pulsation damping effect. While the communication control valve 280 is placed in the open state, the two fluid chambers of the hydraulic cylinder in question are communicated with each other through the fluid passages 250, 252 and the connecting passage 254, and the fluid flows between those two fluid chambers. In this event, too, the fluid flows have a very small influence on the other wheels.

When both of the front right and left wheels 200, 202, or both of the rear right and left wheels 220, 222 have similar bouncing motions, the fluid flows between the corresponding two hydraulic cylinders 210, 212, or between the corresponding two hydraulic cylinders 226, 228. The fluid flows permit the bouncing motions of the wheels in question, without an influence on the other wheels. In this event, the damper valves 297 exhibit a pressure pulsation damping effect.

When the vehicle has a roll motion, the communication control valve 280 is placed in the closed state. When the vehicle has a roll motion during left turning of the vehicle, the fluid pressures in the upper fluid chambers 232 of the two hydraulic cylinders 210, 226 on the right side of the vehicle are raised, while the fluid pressures in the lower fluid chambers 234 of the two hydraulic cylinders 212, 228 on the left side of the vehicle are also raised. These fluid chambers are connected to each other through the fluid passage 250. On the other hand, the fluid pressures in the other fluid chambers connected to each other through the fluid passage 252 are all lowered. In other words, the fluid chambers the pressures of which are raised are connected to each other through the fluid passage 250, and the fluid chambers the pressures of which are lowered are connected to each other through the fluid passage 252, while the connecting passage 254 is placed in the closed state, to prevent the fluid flows from the fluid passage 250 having a comparatively high fluid pressure into the fluid passage 252 having a comparatively low fluid pressure.

In the event indicated above, only small amounts of fluid flows take place between the fluid passage 250 and the accumulators 290, 291, and between the fluid passage 252 and the accumulators 292, 293. As a result, the right wheels 200, 220 are subject to forces that tend to increase the distances between the right wheels and the vehicle body, while the left wheels 202, 222 are subject to forces that tend to reduce the distances between the left wheels and the vehicle body, whereby the roll motion of the vehicle is restricted.

Where the higher one of the fluid pressures in the fluid passages 250, 252 is not higher than a predetermined value even when the vehicle has a roll motion while the communication control vale 280 (valve C) is placed in the closed state, it is determined that the hydraulic circuit 281 suffers from any abnormality, as in the preceding embodiment.

The valves A-C are controlled according to the program illustrated in the flow chart of FIG. 13, such that the suspension system is diagnosed during turning of the vehicle. The valve control in the present embodiment is similar to that in the preceding embodiment, except in that the valves of the present embodiment corresponding to the solenoid-operated valves 110, 112 of the preceding embodiment are not controlled.

Where a fluid leakage from the hydraulic circuit 281 is detected, the two cut-off valves 274, 276 (valves A and B) are both closed to isolate the hydraulic cylinders 210, 212 from the hydraulic cylinders 226, 228, namely, to separate the hydraulic circuit 281 into the front-wheel-side part and the rear-wheel-side part. This arrangement makes it possible to restrict the roll motion of the vehicle in the event of a fluid leakage occurring in one of the two parts of the hydraulic circuit 281, by enabling the other part to normally function. That is, the present arrangement reduces the degree of deterioration of the roll-motion restricting function of the hydraulic circuit, by preventing a failure of the entirety of the hydraulic circuit.

Figure 14:
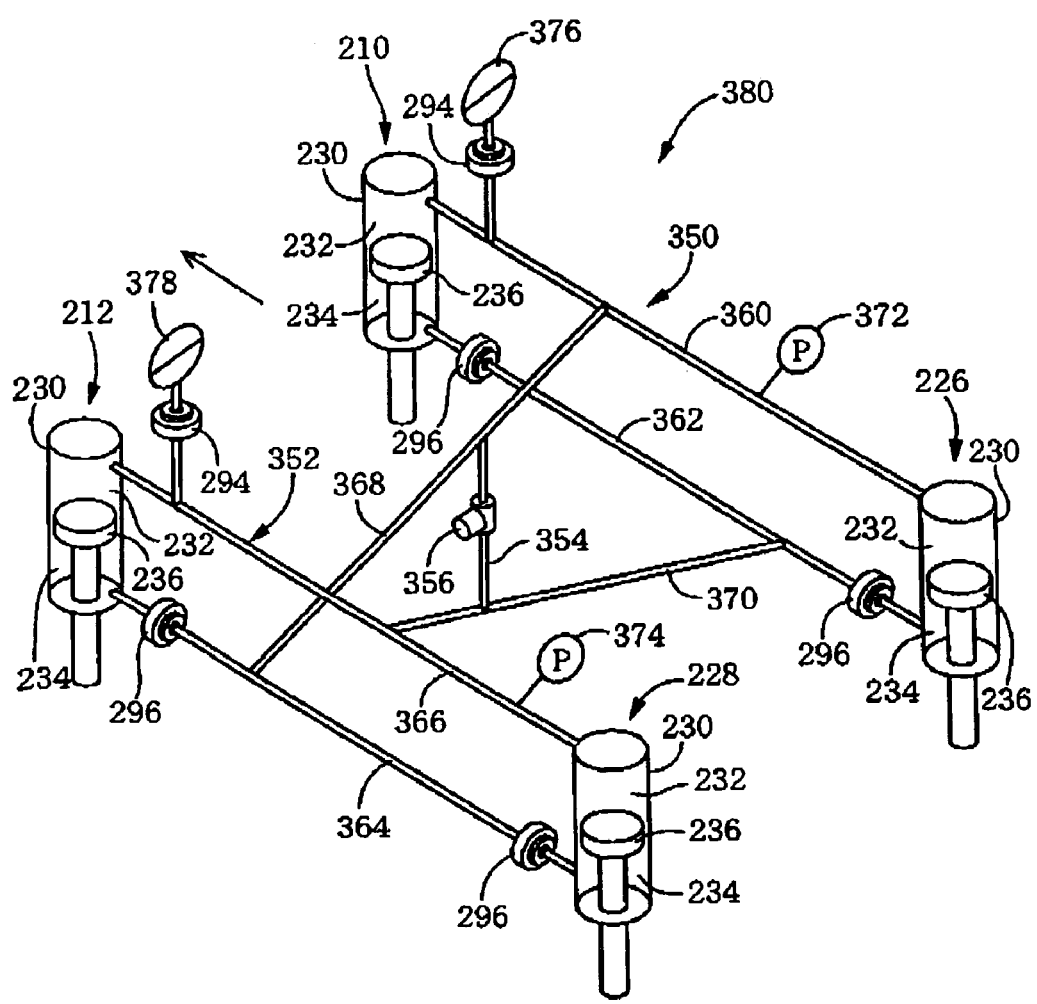
FIG. 14 is a hydraulic circuit diagram of a roll restricting device of a vehicular suspension system according to a further embodiment of this invention.

The arrangement of the hydraulic circuit is not limited to those of the embodiments which have been described. For example, the hydraulic circuit has an arrangement as shown in FIG. 14. In this embodiment of FIG. 14, the upper fluid chambers 232 of the hydraulic cylinders 210, 226 corresponding to the front and rear right wheels and the lower fluid chambers 234 of the hydraulic cylinders 212, 228 corresponding to the front and rear left wheels are connected to each other through a fluid passage 350, while the lower fluid chambers 234 of the hydraulic cylinders 210, 226 on the right side and the upper fluid chambers 242 of the hydraulic cylinders 212, 228 on the left side are connected to each other through a fluid passage 352. The fluid passages 350 and 352 are connected to each other by a connecting passage 354. The connecting passage 354 is provided with a communication control valve 356.

The fluid passage 350 includes a first fluid passage 360 connecting the corresponding fluid chambers of the two hydraulic cylinders 210, 226 on the right side, a second fluid passage 364 connecting the corresponding fluid chambers of the two hydraulic cylinders 212, 228 on the left side, and a third fluid passage 368 connecting the first and second fluid passages 360, 364. Similarly, the fluid passage 350 includes a first fluid passage 362 connecting the corresponding fluid chambers of the two hydraulic cylinders 210, 226, a second fluid passage 366 connecting the corresponding fluid passages of the two hydraulic 212, 228, and a third fluid passage 370 connecting the first and second fluid passages 362, 366. The fluid passages 350, 352 are provided with respective pressure sensors 372, 374, and respective accumulators 376, 378.

In the present embodiment, too, a hydraulic circuit 380 is diagnosed on the basis of a relationship between the fluid pressure or pressures detected by at least one of the pressure sensors 372, 374, and the roll motion of the vehicle. It is possible to determine that a fluid leakage from the hydraulic circuit 380 takes place, if the higher one of the fluid pressures in the fluid passages 350, 352 or a difference between these fluid pressures is lower or smaller than a predetermined value corresponding to the degree of the roll motion of the vehicle, while the communication control valve 356 is placed in the closed state.

It is to be understood that the present invention may be embodied with various other changes and improvements, such as those described in the DISCLOSURE OF THE INVENTION, which may occur to those skilled in the art.

The invention claimed is:

1. A suspension system for a vehicle, characterized by comprising:

a fluid circuit including (a) at least one fluid cylinder provided on each of a front-wheel side and a rear-wheel side of the vehicle, each of said at least one fluid cylinder including a housing, and a piston which separates an interior space of the housing into two fluid chambers, said each fluid cylinder being disposed between a wheel-side member of the vehicle and a body-side member of the vehicle, such that there arises a difference between fluid pressures in said two fluid chambers when at least one of a left wheel and a right wheel is displaced in a vertical direction relative to a body of the vehicle, and (b) two fluid passage systems one of which connects one of the two fluid chambers of said at least one fluid cylinder on said front-wheel side to a corresponding one of the two fluid chambers of said at least one fluid cylinder on said rear-wheel side, and the other of which connects the other of the two fluid chambers of said at least one fluid cylinder on said front-wheel side to the other of the two fluid chambers of said at least fluid cylinder on said rear-wheel side; and a diagnosing device including a fluid-pressure detecting device operable to detect fluid pressures in said two fluid passage systems, said diagnosing device being operable to determine that said fluid circuit has an abnormality of fluid leakage, when a raised one of the fluid pressures in said two fluid passage systems detected by said fluid-pressure detecting device during turning of the vehicle causing an inclination of the body of the vehicle that causes said body to have a lower height on an outer side of a path of turning of the vehicle is lower than a lower limit determined by a force acting on said body so as to cause said inclination.

2. The suspension system according to claim 1, wherein said diagnosing device further comprises a roll-motionrelated-quantity detecting device operable to detect, as said force acting on said body, a roll-motion-related quantity relating to a roll motion of the vehicle, and an abnormality determining portion operable to determine whether said fluid circuit is has said abnormality of fluid leakage, on the basis of a relationship between said raised one of the fluid pressures detected by said fluid-pressure detecting device and said roll-motion-related quantity detected by said roll-motion-related-quantity detecting device.

3. The suspension system according to claim 2, wherein said roll-motion-related-quantity detecting device includes a centrifugal-force-related-quantity detecting device operable to detect, as said force acting on said body, a centrifugal-force-related quantity relating to a centrifugal force acting on the vehicle.

4. The suspension system according to claim 2, wherein said roll-motion-related-quantity detecting device includes a lateral-acceleration detecting device operable to detect a lateral acceleration value of the vehicle, as said force acting on said body.

5. The suspension system according to claim 1, wherein said diagnosing device further includes a running-condition detecting device operable to detect a running condition of the vehicle, and an abnormality determining portion operable to determine whether said fluid circuit has said abnormality of fluid leakage, on the basis of a relationship between the fluid pressure detected by said fluid-pressure detecting device and the running condition detected by said running-condition detecting device.

6. The suspension system according to claim 1, further comprising a fluid-circuit separating device operable to separate said fluid circuit into two parts, when said diagnosing device determines that the fluid circuit has said abnormality of fluid leakage.

7. The suspension system according to claim 1, wherein said wheel-side member is a stabilizer bar provided on each of the front-wheel and rear-wheel sides of the vehicle, and said at least one fluid cylinder on each of the front-wheel and rear-wheel sides is disposed between said stabilizer bar and said body-side member, said two fluid passage systems consisting of two fluid passages one of which connects one of the two fluid chambers of said at least one fluid cylinder on said front-wheel side to a corresponding one of the two fluid chambers of said at least one fluid cylinder on said rear-wheel side, and the other of which connects the other of the two fluid chambers of said at least one fluid cylinder on said front-wheel side to the other of the two fluid chambers of said at least one fluid cylinder on said rear-wheel side.

8. The suspension system according to claim 7, further comprising a cut-off device operable between a state for permitting fluid flows through said two fluid passages, and a state for inhibiting the fluid flows through the two fluid passages.

9. The suspension system according to claim 8, further comprising a cut-off-device control device operable to place said cut-off device in the state for inhibiting the fluid flows through said two fluid passages, when said diagnosing device has detected an abnormality of said fluid circuit.

10. The suspension system according to claim 7, wherein said two fluid passages are provided with respective accumulators, and control valves are disposed between the respective two fluid passages and the respective accumulators.

11. The suspension system according to claim 10, further comprising a valve control device operable upon determination by said diagnosing device that said fluid circuit has said abnormality of fluid leakage, said valve control device opening said control, valves for fluid communication between said two fluid passage systems.

12. The suspension system according to claim 1, wherein said at least one fluid cylinder provided on each of said front-wheel and rear-wheel sides of the vehicle consists of fluid cylinders disposed for said left and right wheels, respectively, between the wheel-side member and the body-side member, and said one of said two fluid passage systems connects one of the two fluid chambers of each of the four fluid cylinders to corresponding ones of the two fluid chambers of the other of the four fluid cylinders, while said other of the two fluid passage systems connects the other of the two fluid chambers of said each of the four fluid cylinders to the other of said other of the four fluid cylinders.

13. The suspension system according to claim 12, further comprising an emergency cut-off device operable to isolate a first fluid circuit and a second fluid circuit from each other, when said abnormality of fluid leakage of said fluid circuit is detected by said diagnosing device, said first fluid circuit including the two fluid cylinders respectively provided for one of front and rear wheels located on a right side of the vehicle and one of front and rear wheels located on a left side of the vehicle, while said second fluid circuit including the other two fluid cylinders.

14. The suspension system according to claim 13, wherein each of said two fluid passage systems includes a first fluid passage connecting the corresponding fluid chambers of said two fluid cylinders, a second fluid passage connecting the corresponding fluid chambers of the other two fluid cylinders, and a third fluid passage connecting said first and second fluid passages, and said emergency cut-off device includes a fluid-passage cut-off device operable to inhibit fluid flows through said third fluid passage.

15. The suspension system according to claim 1, wherein said fluid circuit includes (a) a connecting passage connecting said two fluid passage systems to each other, and (b) a communication control valve provided in said connecting passage, said suspension system further comprising a communication-control-valve control device operable to control said communication control valve on the basis of a running condition of the vehicle.

16. The suspension system according to claim 15, wherein said communication-control-valve control device includes a fluid-pressure control portion operable to control said communication control valve for controlling a fluid pressure in each of said two fluid chambers of said at least one fluid cylinder such that said two fluid chambers do not provide an effect of restricting a roll motion of the vehicle, while the vehicle is running straight.

17. The suspension system according to claim 16, wherein each of said at least one fluid cylinder has a piston rod extending from one of opposite surfaces of said piston, and said communication-control-valve control device is configured to hold said communication control valve in an open state during a straight running of the vehicle, until a difference between the fluid pressures in said two fluid passage systems becomes equal to a value determined by a difference between pressure-receiving surface areas of said piston which respectively correspond to said two fluid chambers.

18. The suspension system according to claim 1, wherein said each of said at least one fluid cylinder has two piston rods extending from said piston in respective opposite directions, and one of said two piston rods is held in engagement with said wheel-side member.

* * * * *